US012448843B2

(12) United States Patent
Adams

(10) Patent No.: US 12,448,843 B2
(45) Date of Patent: Oct. 21, 2025

(54) FALL PROTECTION SYSTEM

(71) Applicant: Formetco, Inc., Duluth, GA (US)

(72) Inventor: Jonathon Christopher Adams, Hoschton, GA (US)

(73) Assignee: Formetco, LLC, Duluth, GA (US)

( * ) Notice: Subject to any disclaimer, the term of this patent is extended or adjusted under 35 U.S.C. 154(b) by 674 days.

(21) Appl. No.: 17/739,615

(22) Filed: May 9, 2022

(65) Prior Publication Data

US 2022/0259923 A1 Aug. 18, 2022

Related U.S. Application Data

(62) Division of application No. 16/208,868, filed on Dec. 4, 2018, now Pat. No. 11,480,013.

(60) Provisional application No. 62/623,803, filed on Jan. 30, 2018, provisional application No. 62/594,050, filed on Dec. 4, 2017.

(51) Int. Cl.
*E06C 7/18* (2006.01)
*A62B 35/00* (2006.01)
*A62B 35/04* (2006.01)

(52) U.S. Cl.
CPC .......... *E06C 7/186* (2013.01); *A62B 35/0037* (2013.01); *A62B 35/04* (2013.01); *A62B 35/0068* (2013.01)

(58) Field of Classification Search
CPC ..... E06C 7/186; A62B 35/0037; A62B 35/04; A62B 35/005; A62B 35/0068
See application file for complete search history.

(56) References Cited

U.S. PATENT DOCUMENTS

| | | | |
|---|---|---|---|
| 1,630,484 | A | 5/1927 | Fritts |
| 3,598,200 | A | 8/1971 | Thompson |
| 3,908,791 | A | 9/1975 | Kleine |
| 4,252,214 | A | 2/1981 | Miller |
| 4,709,783 | A | 12/1987 | Tomioka et al. |
| 5,964,316 | A | 10/1999 | Roy |
| 7,600,610 | B2 | 10/2009 | Deuer |
| 8,348,014 | B2 | 1/2013 | Kerstetter, Jr. |
| 8,875,839 | B1 | 11/2014 | Licea |
| 8,974,334 | B2 | 3/2015 | Stephenson |
| 9,080,383 | B2 | 7/2015 | Meillet |
| 9,284,777 | B1 | 3/2016 | Licea et al. |
| 9,663,990 | B2 | 5/2017 | Kramer |
| 9,784,034 | B2 | 10/2017 | Short |
| 10,806,955 | B2 | 10/2020 | Herik Van Den |

(Continued)

FOREIGN PATENT DOCUMENTS

| | | |
|---|---|---|
| CN | 206091862 U | 4/2017 |
| CN | 206174859 U | 5/2017 |

(Continued)

OTHER PUBLICATIONS https://worldwide.espacenet.com/publicationDetails/biblio?CC=JP&NR=H071298U&KC=U&FT=D&ND=3&date=19950110&DB=&locale=en+EP (Year: 2021).

*Primary Examiner* — Colleen M Chavchavadze
(74) *Attorney, Agent, or Firm* — Womble Bond Dickinson (US) LLP

(57) ABSTRACT

A fall protection system having a top bracket assembly that is mountable to a top portion of the ladder, a spaced bottom bracket assembly that is mountable to a bottom portion of the ladder, and a cable extending therebetween portions of the top bracket assembly and the bottom bracket assembly substantially parallel to a plane bisecting the vertical ladder at a desired distance from the plane.

27 Claims, 35 Drawing Sheets

(56) References Cited

U.S. PATENT DOCUMENTS

| | | | |
|---|---|---|---|
| 10,890,029 B2 | 1/2021 | Simon |
| 10,940,338 B1 | 3/2021 | Miller |
| 11,480,013 B2 | 10/2022 | Adams |
| 2010/0219016 A1 | 9/2010 | Meillet |
| 2015/0252619 A1 | 9/2015 | Kramer |
| 2017/0096856 A1 | 4/2017 | Libert |
| 2019/0169934 A1 | 6/2019 | Adam |
| 2020/0347675 A1 | 11/2020 | Knickrehm |
| 2021/0238924 A1 | 8/2021 | MacKarvich |
| 2022/0259922 A1 | 8/2022 | Adams |

FOREIGN PATENT DOCUMENTS

| | | | |
|---|---|---|---|
| EP | 2581115 | A1 | 4/2013 |
| EP | 2826947 | A1 | 1/2015 |
| ES | 2385530 | A1 | 7/2012 |
| GB | 2517675 | A | 3/2015 |
| JP | 07-001298 | U | 1/1995 |
| JP | 2992504 | B2 | 12/1999 |
| JP | 2001302185 | A | 10/2001 |
| JP | 2002046986 | A | 2/2002 |

FALL PROTECTION SYSTEM

CROSS-REFERENCE TO RELATED APPLICATIONS

This application is a divisional of U.S. patent application Ser. No. 16/208,868, filed Dec. 4, 2018, which claims the benefit of U.S. Provisional Patent Application No. 62/594,050, filed on Dec. 4, 2017; and U.S. Provisional Patent Application No. 62/623,803, filed on Jan. 30, 2018.

INCORPORATION BY REFERENCE

The disclosure of U.S. patent application Ser. No. 16/208,868, filed Dec. 4, 2018, U.S. Provisional Patent Application No. 62/594,050, filed on Dec. 4, 2017; and U.S. Provisional Patent Application No. 62/623,803, filed on Jan. 30, 2018, are hereby incorporated by reference for all purposes as if presented herein in their entirety.

FIELD OF THE INVENTION

The present invention relates generally to fall protection safety devices and, in particular, to a fall protection system for use in conjunction with a fall protection device and a ladder cage on the side of a structure.

DESCRIPTION OF RELATED ART

There are many structures, e.g., billboards, towers, bridges, cell-phone towers, antenna structures, and the like, that require maintenance or access thereto from a bottom area to a top area of the respective structures. In order to provide access to the desired locations, vertical ladders are typically provided that are fixedly attached to the structure. Typically, the bottom portion of such ladders are spaced from the ground by a desired distance to prevent unauthorized access to the vertical ladders. To provide further safety measures, it is known to position a substantially vertical cable adjacent the ladder, where the cable extends from the bottom to the top of the ladder. In use, an operator will attach a conventional fall protection device (sometimes referred to as a "cable grab") to the cable, and will connect an attachment member, such as a carabiner, to the device with a line attached between the carabiner and a connection point on the person. This fall protection device is configured to allow free movement as the person climbs up or down the ladder. However, if the movement in the downward direction is too fast, which indicates a possible fall event, the fall protection device will operate to grip or contact the cable and brake or stop movement in the downward direction, thereby protecting the person from falling and potentially harming themselves.

One drawback of known fall protection systems that include cables is the difficulty in installing the system on the vertical ladder and the associated difficulty in maintaining the fall protection system in compliance with safety operational requirements. Accordingly, there is a need in the art for an improved fall protection system, which can be efficiently coupled to a preexisting vertical ladder and that provides for ready inspection in accord with safety requirements.

SUMMARY

Described herein is fall protection system and a method of using a fall protection system. In one aspect, the fall protection system of the present invention provides a fall protection system having an efficient simple design that permits a user to quickly and easily attach the fall protection system to a desired portion of the substantially vertical wall or ladder, which is fixedly attached to an associated structure. In one aspect, portions of the fall protection system utilized the load placed on a portion of the ladder to fix the fall protection system relative to the ladder. In a further aspect, the fall protection system minimizes any undesired structure that extends on the operator used side of the vertical ladder.

In one aspect, the fall protection system is configured to space a substantially vertical cable from the substantially vertical wall or ladder. In this aspect, the fall protection system can have top bracket assembly that is mountable to a top portion of the ladder, a spaced bottom bracket assembly that is mountable to a bottom portion of the ladder, and a cable extending therebetween portions of the top bracket assembly and the bottom bracket assembly. It is contemplated that the cable will be spaced a desired distance and will extend substantially parallel to a plane bisecting the vertical ladder. The fall protection system can also comprise a cable guide that is mountable to the ladder between the respective top and bottom bracket assemblies.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
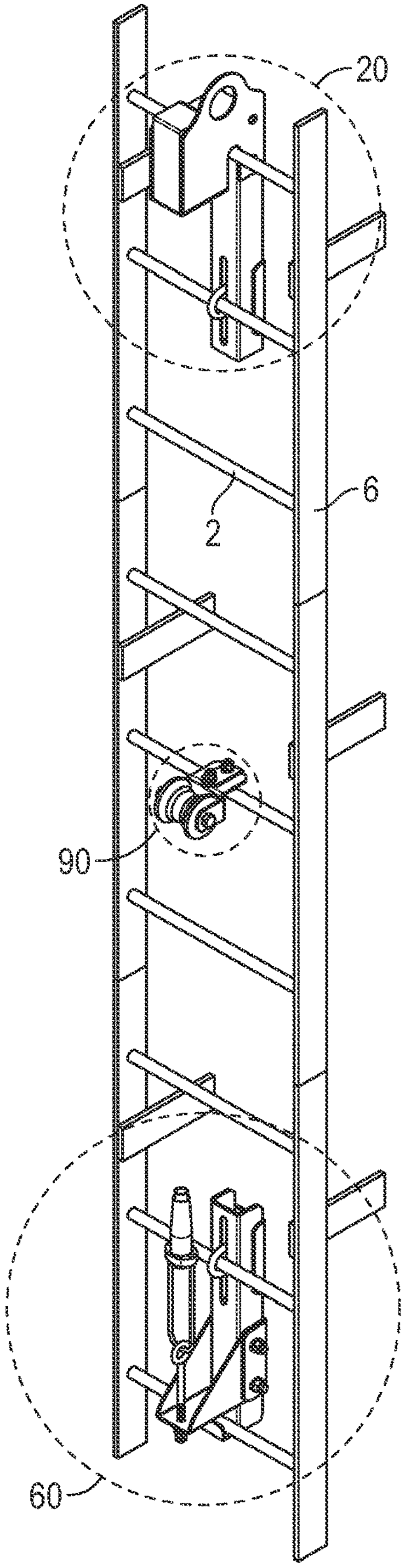
FIG. 1 is a perspective view of a first embodiment of a fall protection system, showing a top bracket assembly, a bottom bracket assembly, and a cable guide mounted thereon a substantially vertical ladder, and showing a tensioned cable extending between the top and bottom bracket assemblies.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a" "an" and "the" include plural referents unless the context clearly dictates otherwise. Thus, for example, reference to "an opening" can include two or more such openings unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

Described herein is a fall protection system 10 and a method of using a fall protection system. In a typical installation, the fall protection system 10 is fixedly coupled to a substantially vertical ladder 2. A conventional ladder 2, having a pair of spaced vertical legs 6 and a plurality of spaced transversely mounted rungs 8, is typically positioned to appropriately space the ladder from associated structure, such as e.g., billboards, towers, bridges, cell-phone towers, antenna structures, and the like.

Figure 2:
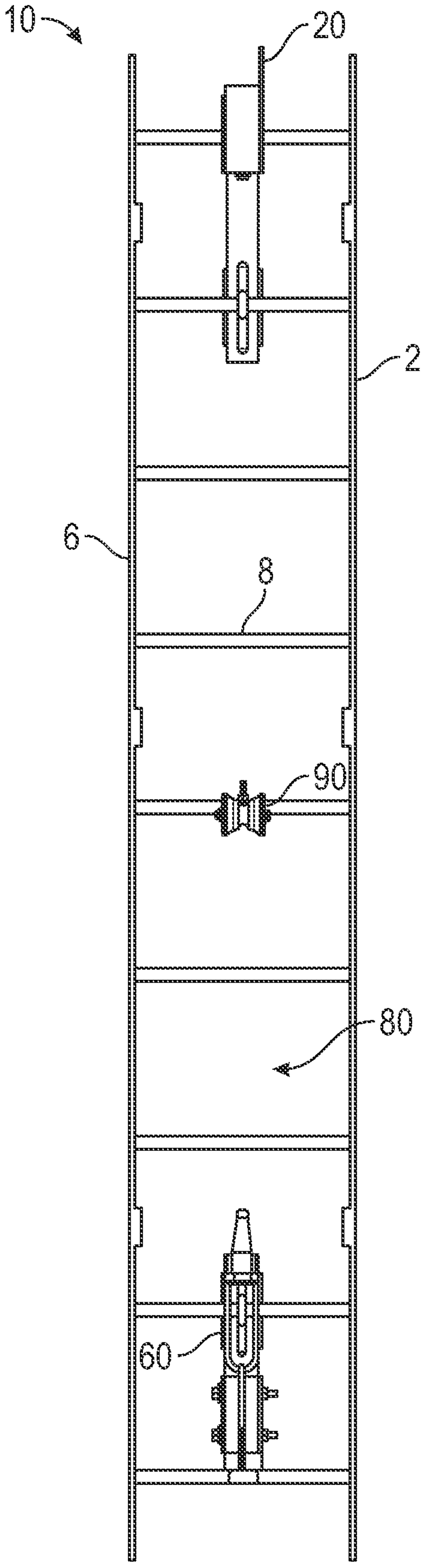
FIG. 2 is a front elevational view of the fall protection system of FIG. 1.
Figure 3:
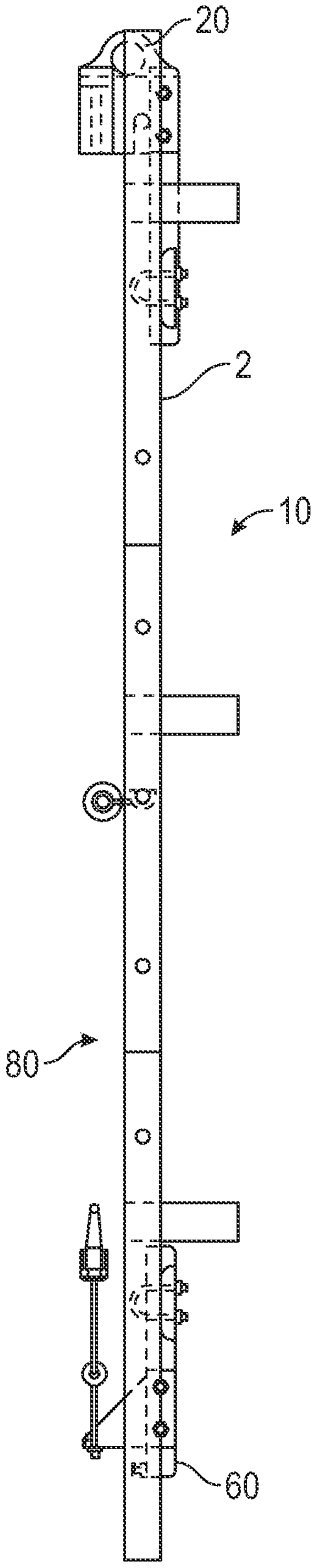
FIG. 3 is a side elevational view of the fall protection system of FIG. 1.
Figure 4:
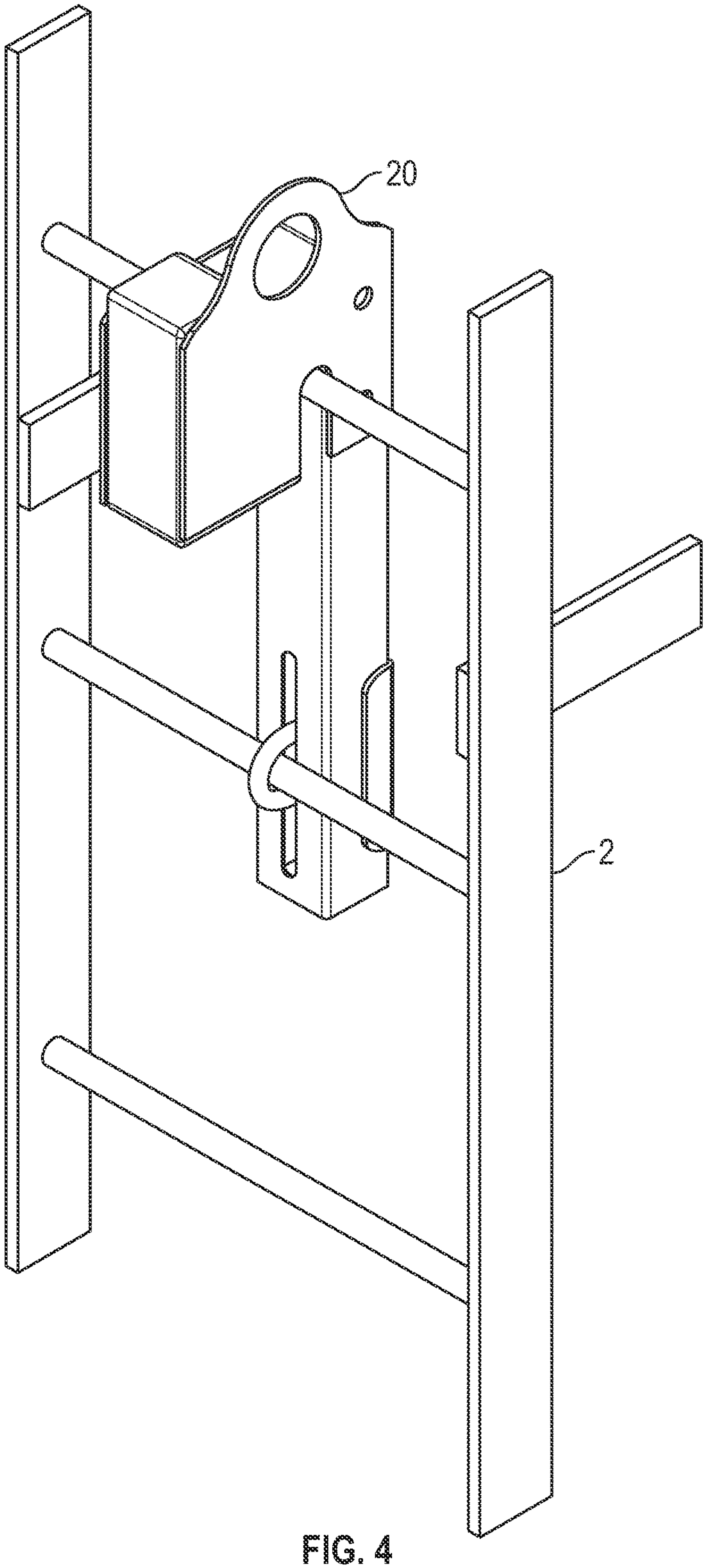
FIG. 4 is a perspective view of the top bracket assembly of FIG. 1 mounted thereon the vertical ladder.

Referring to FIGS. 1-3, the fall protection system 10 that is fixedly mountable to a vertical ladder can comprise a top bracket assembly 20, a spaced bottom bracket assembly 60, and a cable 80 extending therebetween portions of the top bracket assembly and the bottom bracket assembly. It is contemplated that the cable can be operably coupled to the respective top and bottom bracket assemblies under a desired tension load sufficient to appropriately space the cable from the plane of the substantially vertical ladder. The fall protection system can also comprise a cable guide 90 that is mountable to the ladder between the respective top and bottom bracket assemblies.

The top bracket assembly 20, bottom bracket assembly 60, and cable guide 90 described herein can be made from any material possessing the necessary strength to support the tensioned cable 80 and the concomitant load thereon when the fall protection system is in use, such as, for example and without limitation, galvanized steel, aluminum or metal tubing or solid stock, plastic, reinforced fiberglass, carbon fiber, suitable hardwoods, and the like. One of ordinary skill in the art will recognize that this list is representative of materials that may be used, and not exhaustive.

In one aspect, the top and bottom bracket assemblies are configured to fixedly mount to the ladder and aids is stabilizing the cable that extends under tension therebetween. The top bracket assembly 20 can be mountable to a top portion of the ladder, the spaced bottom bracket assembly 60 can be mountable to a bottom portion of the ladder, and, if used, the cable guide 90 can be mountable to the ladder between the respective top and bottom bracket assemblies.

Figure 5:
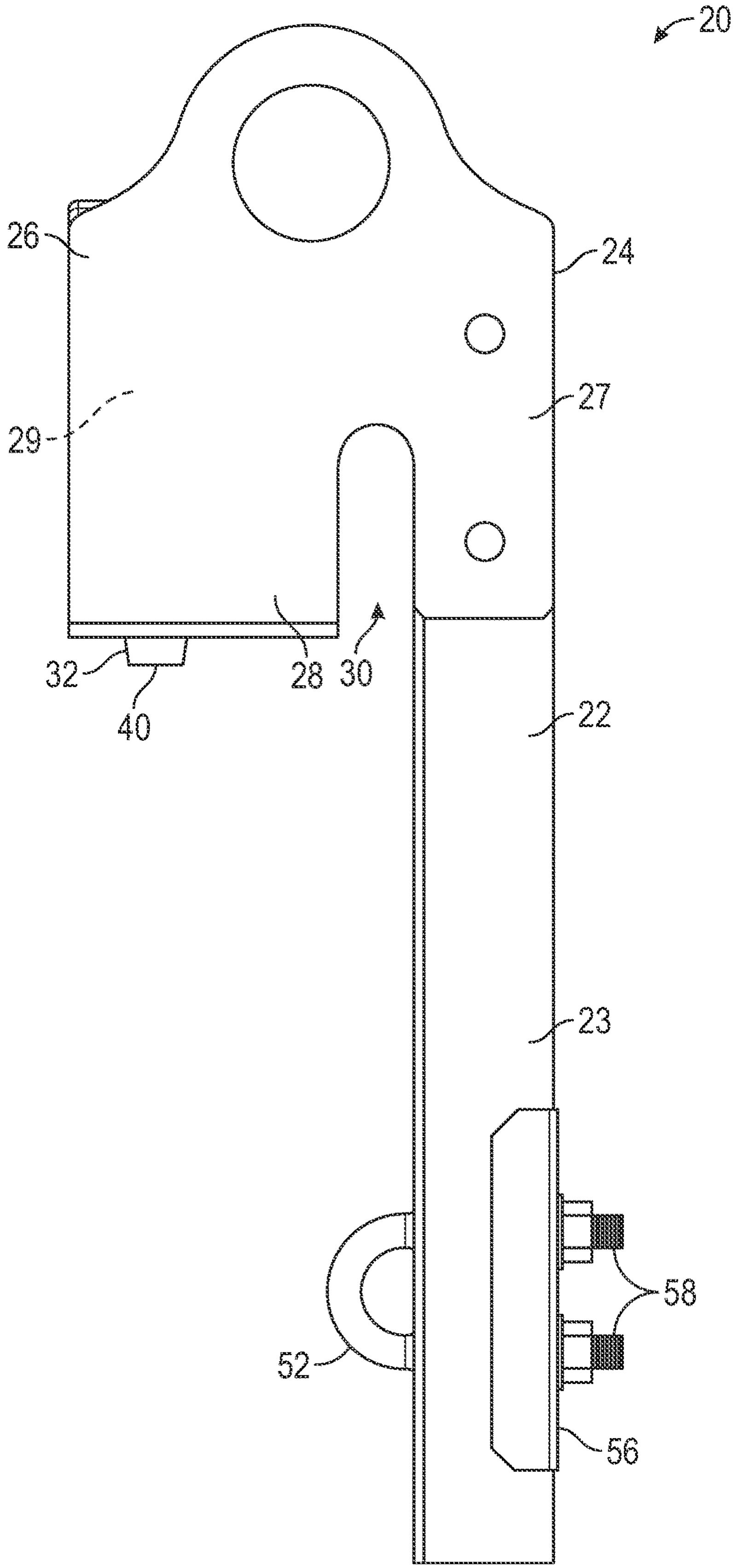
FIG. 5 is a side elevational view of the top bracket assembly of FIG. 4.
Figure 6:
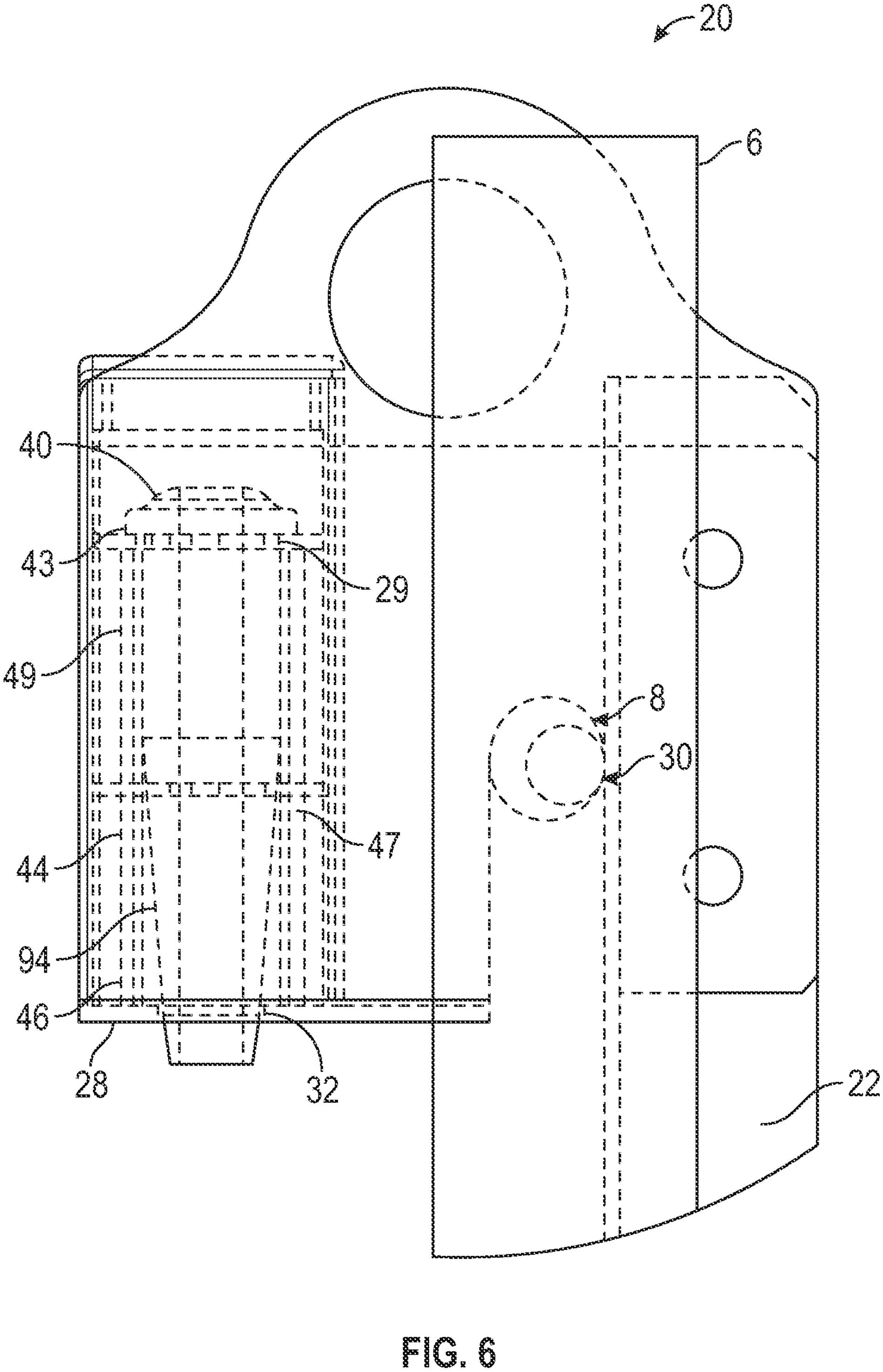
FIG. 6 is a partial transparent side elevational partially transparent view of the top bracket assembly of FIG. 4.
Figure 7:
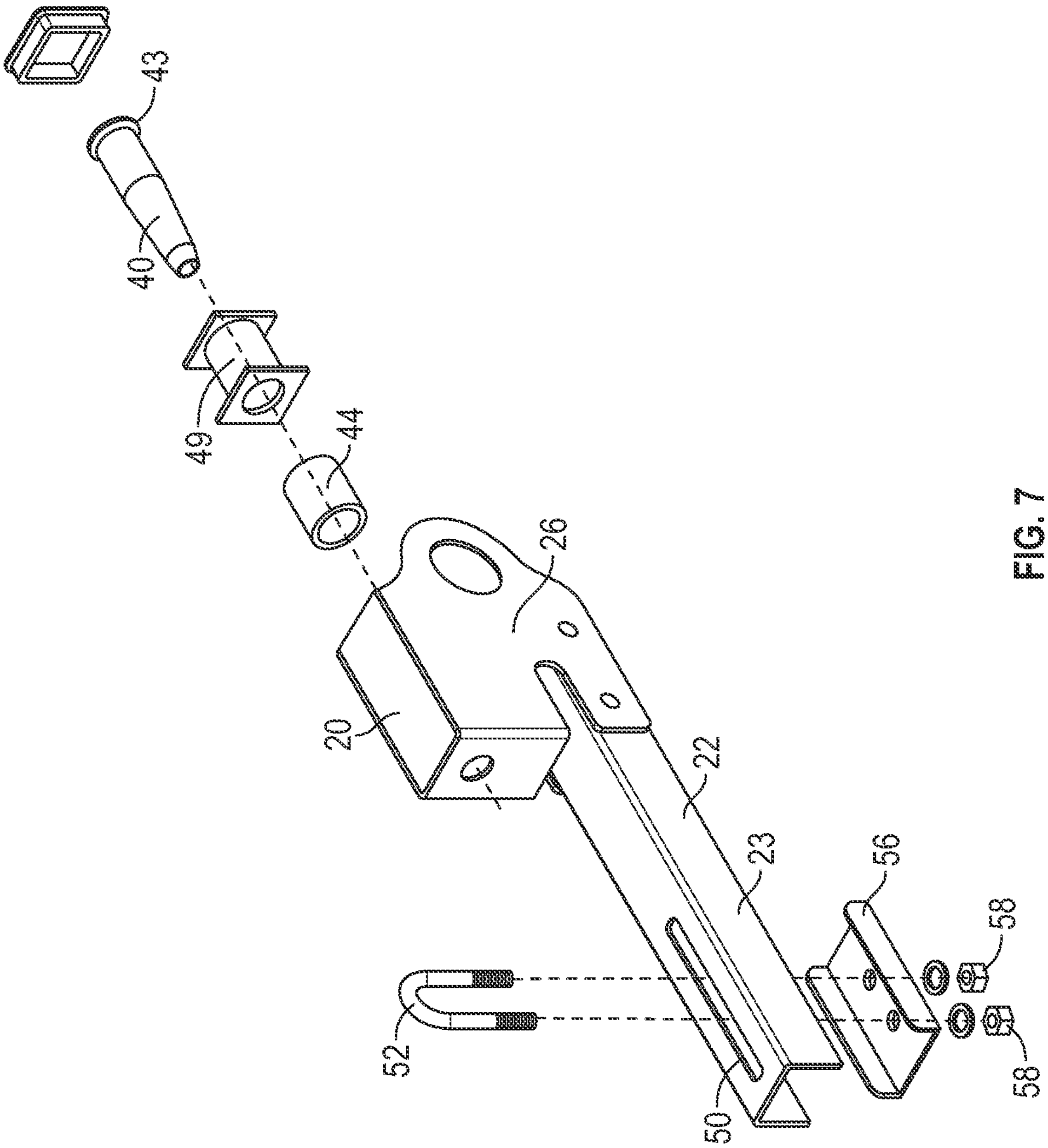
FIG. 7 is an exploded perspective view of the top bracket assembly of FIG. 4.

In one aspect, and as shown in FIGS. 4-7, the top bracket assembly 20 can comprise an elongated vertical member 22 having a lower portion 23 and an upper portion 24 and a horizontal member 26 that has a proximal portion 27 that is integrally coupled to the upper portion 24 of the vertical member. The horizontal member 26 extends outwardly therefrom the upper portion 24 of the vertical member and defines an interior cavity 29 proximate the distal portion of the horizontal member. A bottom surface 28 of the horizontal member 26 defines a slot 30 that extends substantially vertically therein the horizontal member and that is sized and shaped to accept a horizontal rung of the ladder. The bottom surface 28 of the horizontal member further defines a port 32 that communicates with the interior cavity of the horizontal member. Thus, as shown in FIG. 5, it is contemplated that the top bracket assembly member 20 can have an inverted J-shape in cross-section.

In a further aspect, the interior cavity 29 of the horizontal member is configured to accept a first conventional automatic cable connector 40 that includes a tubular housing 42 having an open end into which a cable end can be received. The tubular housing 42 includes a distal tapered exterior surface 94 that can be received within the port 32. In operation, the tubular housing 42 of the conventional automatic cable connector 40 comprises a spring that is configured to continually biases jaw segments toward an interior tapered surface. When a cable end is inserted into the open end of the tubular housing, the cable end moves the jaws away from the interior tapered surface against the bias of the spring, permitting the cable to pass between the jaws. After the cable is inserted, the spring biases the jaw segments into engagement with the tapered surface. Thus, when the cable is then subjected to tension, the jaws are pulled against the tapered surface to firmly grip the cable. Examples of this known type of automatic cable connector 40 are the STRANDVISE® cable termination connectors of MACLEAN POWER SYSTEMS. In this aspect, the top bracket assembly 20 can further comprises a polymer tension tube 44 and a washer assembly 49 that are configured to receive the tubular housing of the first automatic cable connector. The polymer tension tube 44 is positioned within the interior cavity 29 of the horizontal member with the proximal end 46 of the tension tube being in contact with the portions of the horizontal member surrounding the port 32. The washer assembly 49 is positioned proximate the distal end 47 of the tension tube and the distal shoulder 43 of the automatic cable connector 40.

The lower portion 23 of the elongated vertical member 22 can define an elongated slot 50 that extends substantially vertically. This slot 50 is configured to accept the ends of a U-shaped coupling device 52.

In operation, the top bracket assembly 20 is coupled to the ladder by positioning the elongated vertical member 22 on the non-operator side of the ladder and lowering the top bracket assembly until a horizontal rung is seated within the slot 30 defined in the bottom surface 28 of the horizontal member 26. This insures that any loading imposed on the top bracket assembly during operation will be transferred to the ladder and will not result in vertical loading on any other coupling means of the top bracket assembly to the ladder. Subsequently, the U-shaped coupling device 52 can be inserted into the slot 50 to capture a rung of the ladder between the coupling device 52 and the exterior surface of the lower portion 23 of the elongated vertical member 22. Once captured, a backing plate 56 is placed over the ends of the U-shaped coupling device and conventional nuts 58 are coupled to the ends of the U-shaped coupling device to secure the top bracket assembly relative to the ladder.

Figure 8:
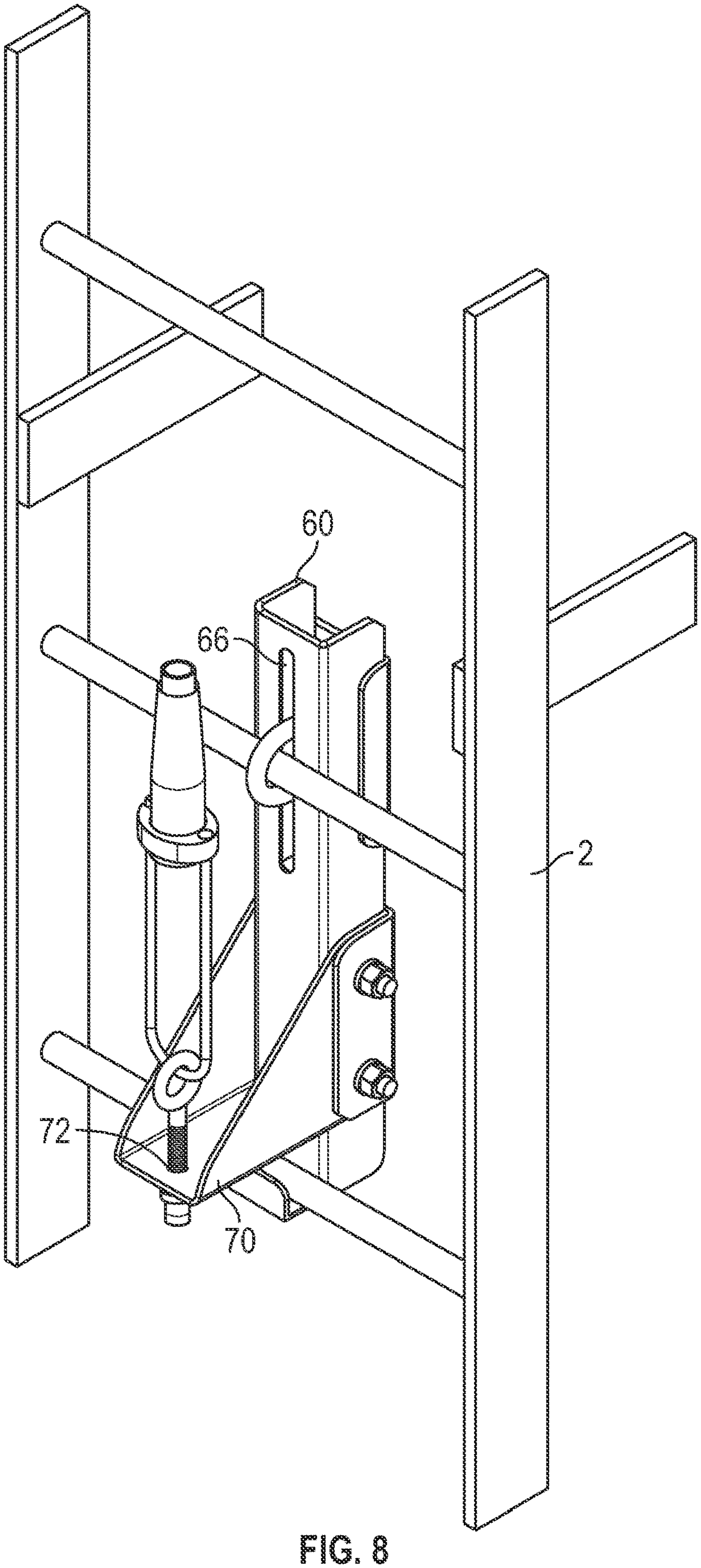
FIG. 8 is a perspective view of a first embodiment of a bottom bracket assembly of FIG. 1 mounted thereon the vertical ladder.
Figure 9:
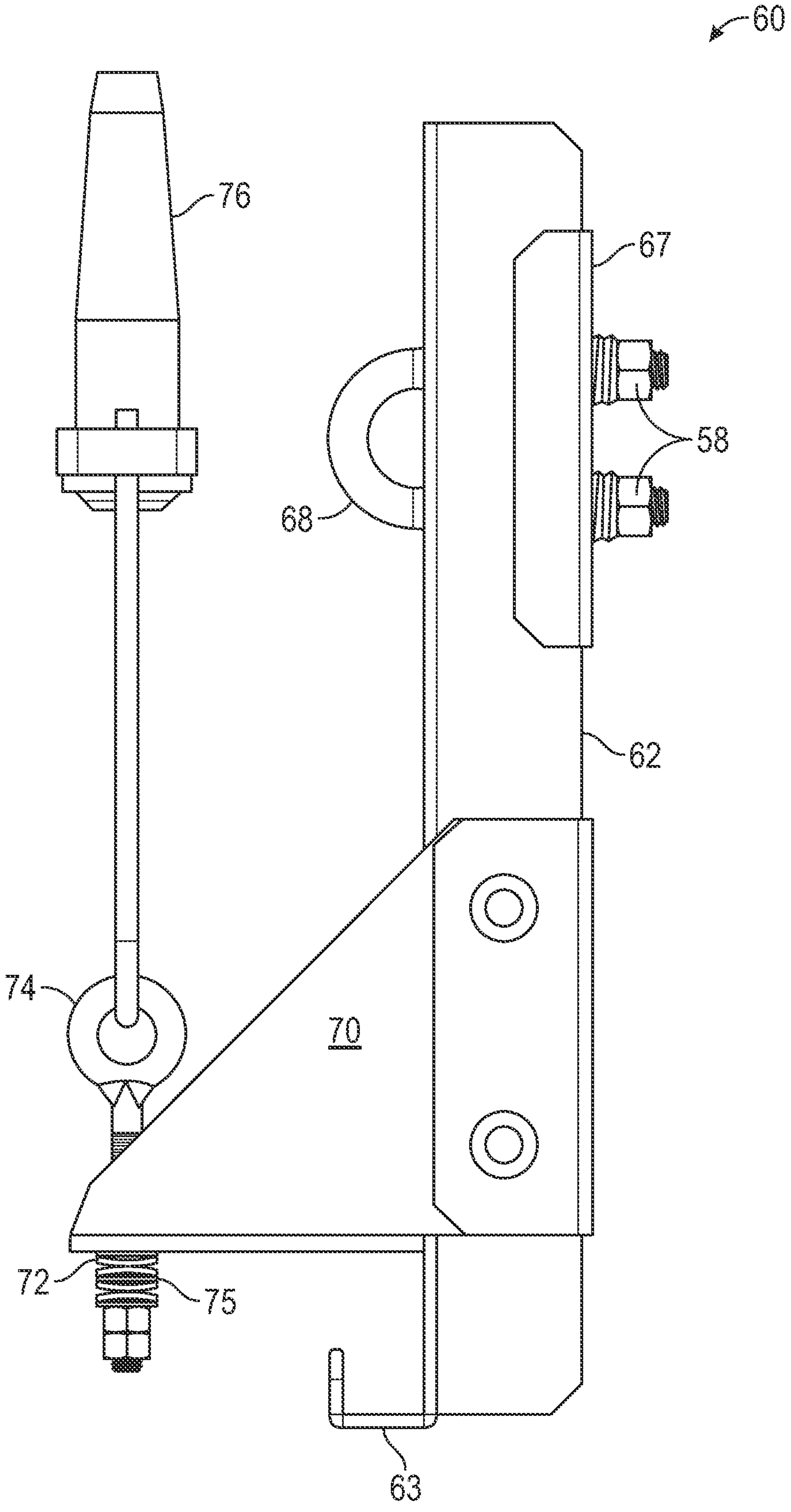
FIG. 9 is a side elevational view of the bottom bracket assembly of FIG. 8.
Figure 10:
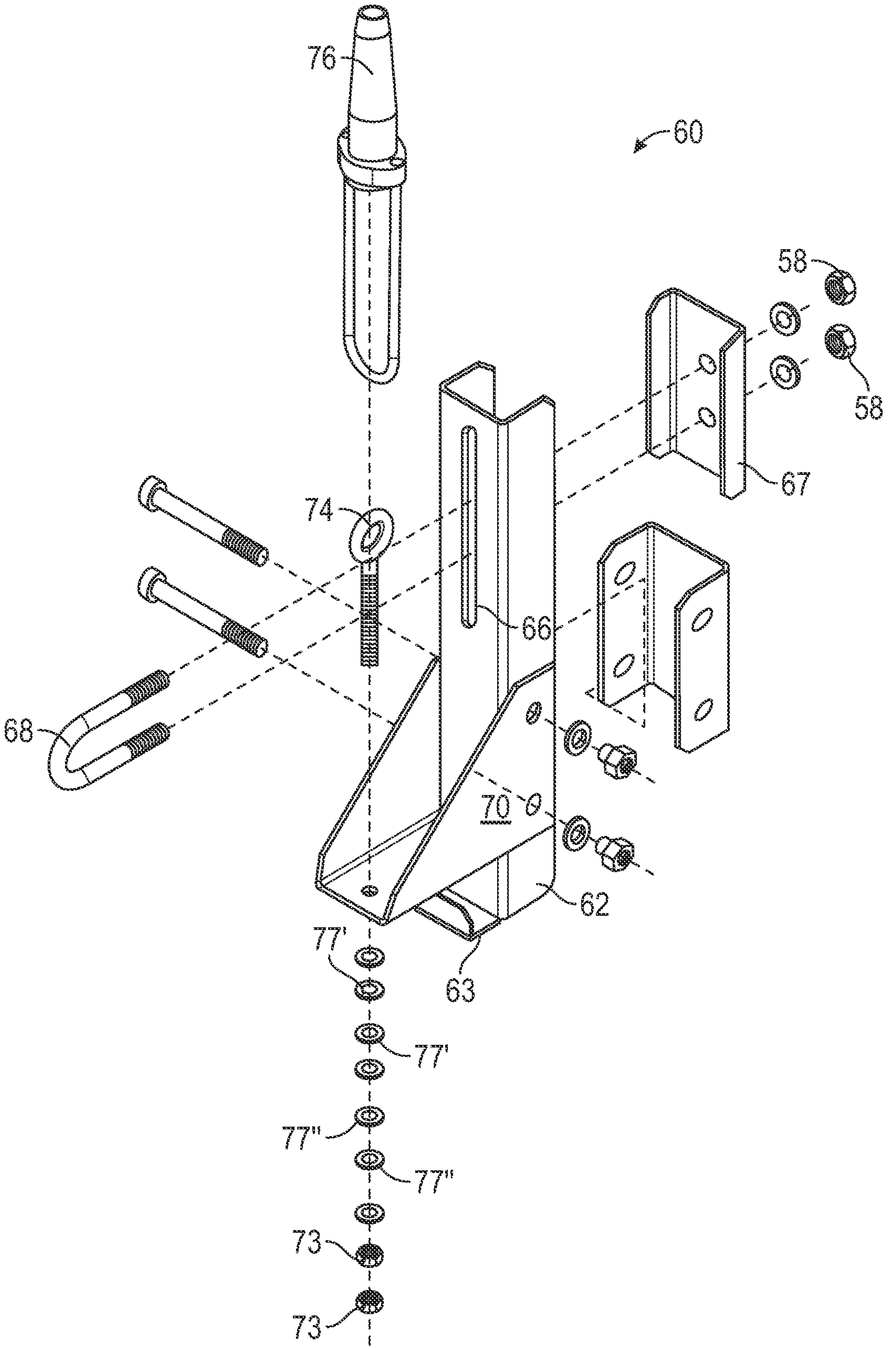
FIG. 10 is an exploded perspective view of the bottom bracket assembly of FIG. 8.

Referring now to FIGS. 8-10, a first embodiment of the bottom bracket assembly 60 can comprise an elongated vertical member 62 and a horizontal member 70 that that is integrally coupled to the vertical member. The horizontal member 70 extends outwardly therefrom the vertical member 62 and defines an opening 72 that is configured to accept an eye bolt 74 having an elongated shaft and a threaded end. A horizontally extending lip 63 can be connected to the lower end of the vertical member 62 and form a J-shape in cross-section to allow the bottom bracket assembly 60 to connect to a portion of a rung of the ladder. In a further aspect, a second conventional automatic cable connector 76, such as described above, can be conventionally coupled to the distal end of the eyebolt 74.

The upper portion of the elongated vertical member 62 can define an elongated slot 66 that extends substantially vertically. This slot 66 is configured to accept the ends of a U-shaped coupling device 68.

In operation, the bottom bracket assembly 60 is coupled to the ladder by positioning the elongated vertical member 62 on the non-operator side of the ladder and raising the bottom bracket assembly until a horizontal rung is seated within lip 63. Subsequently, the U-shaped coupling device 68 can be inserted into the slot 66 to capture a rung of the ladder between the coupling device 68 and the exterior surface of the upper portion of the elongated vertical member 62. Once captured, a backing plate 67 is placed over the ends of the U-shaped coupling device and conventional nuts 59 are coupled to the ends of the U-shaped coupling device to secure the bottom bracket assembly relative to the ladder.

Figure 11:
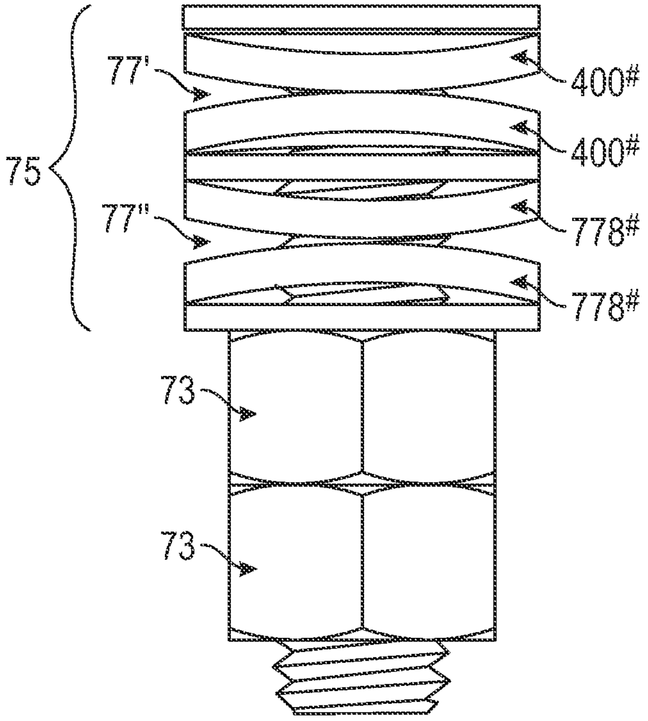
FIG. 11 is an enlarged side elevational view of a portion of the bottom bracket assembly of FIG. 9 showing the use of a plurality of Belleville washers in a pretightened position.
Figure 12:
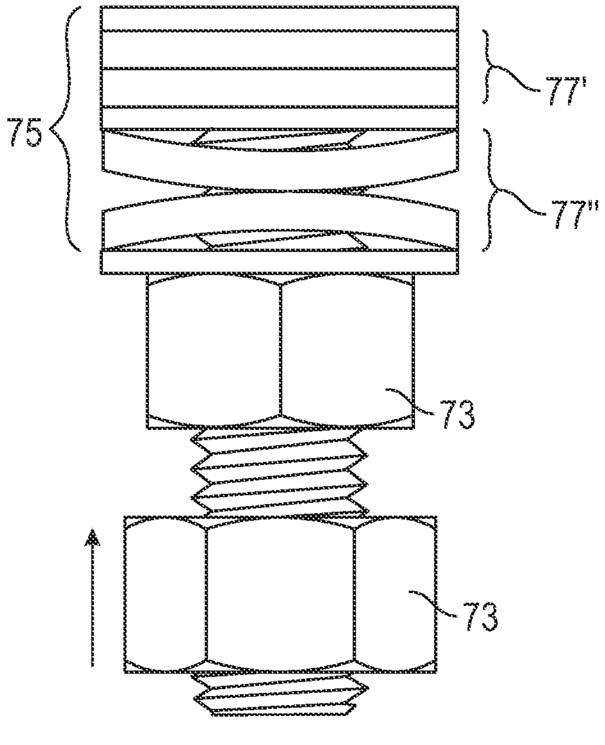
FIG. 12 is a partial side elevational view of a portion of the bottom bracket assembly of FIG. 9, showing the plurality of Belleville washers positioned to tension the attached cable to the desired level.
Figure 13:
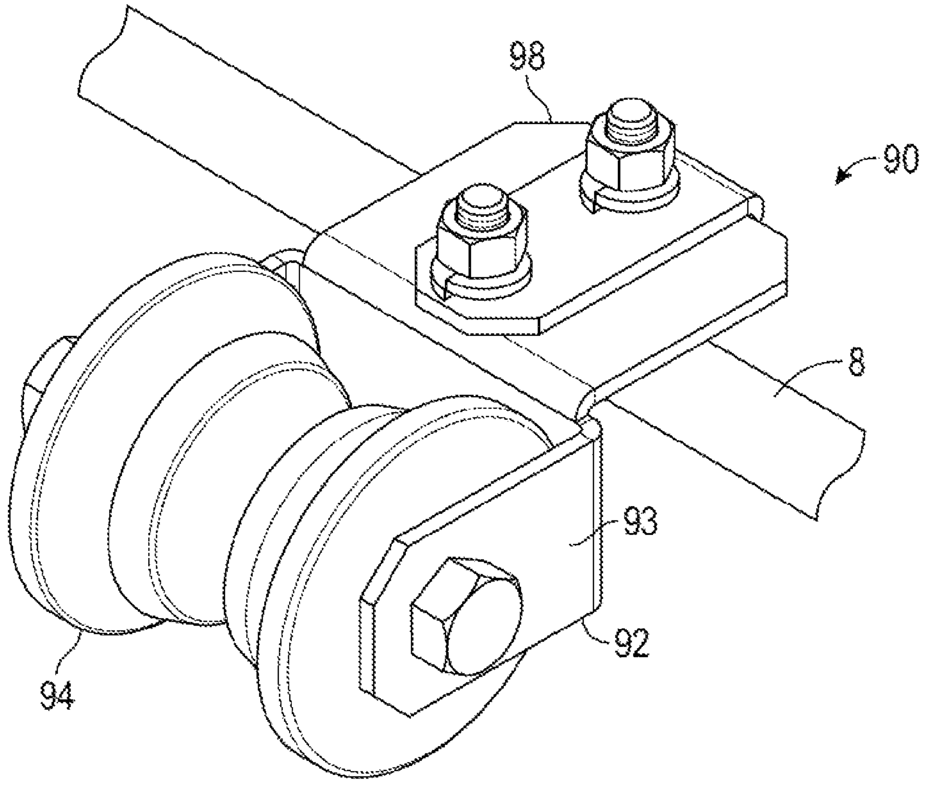
FIG. 13 is a perspective view of a first embodiment of a cable guide of FIG. 1 mounted thereon the vertical ladder.
Figure 14:
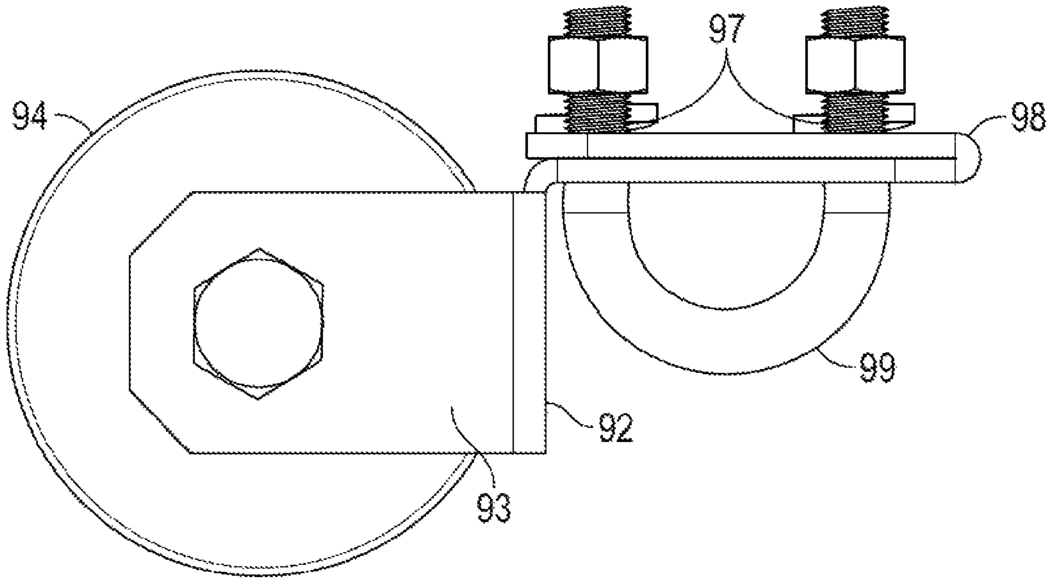
FIG. 14 is a side elevational view of the cable guide of FIG. 13.
Figure 15:
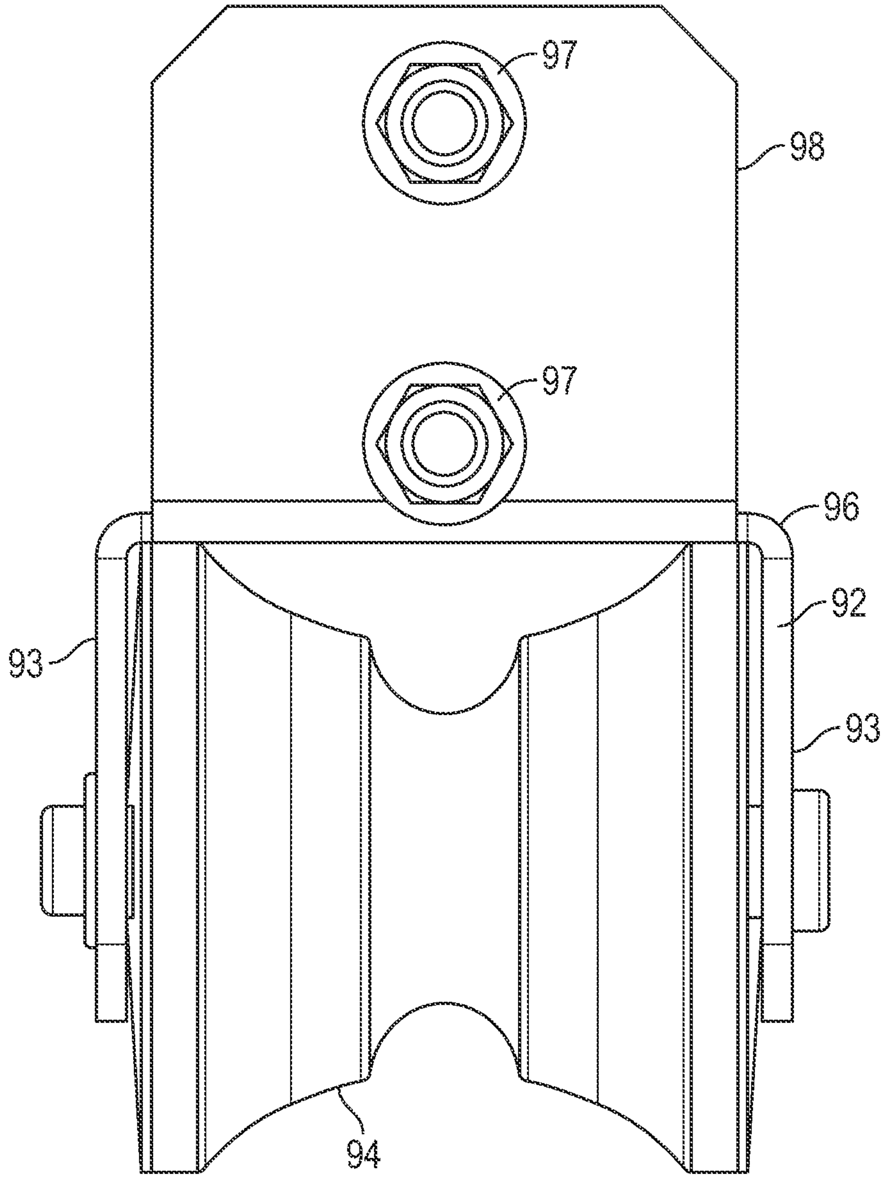
FIG. 15 is a top elevational view of the cable guide assembly of FIG. 13.
Figure 16:
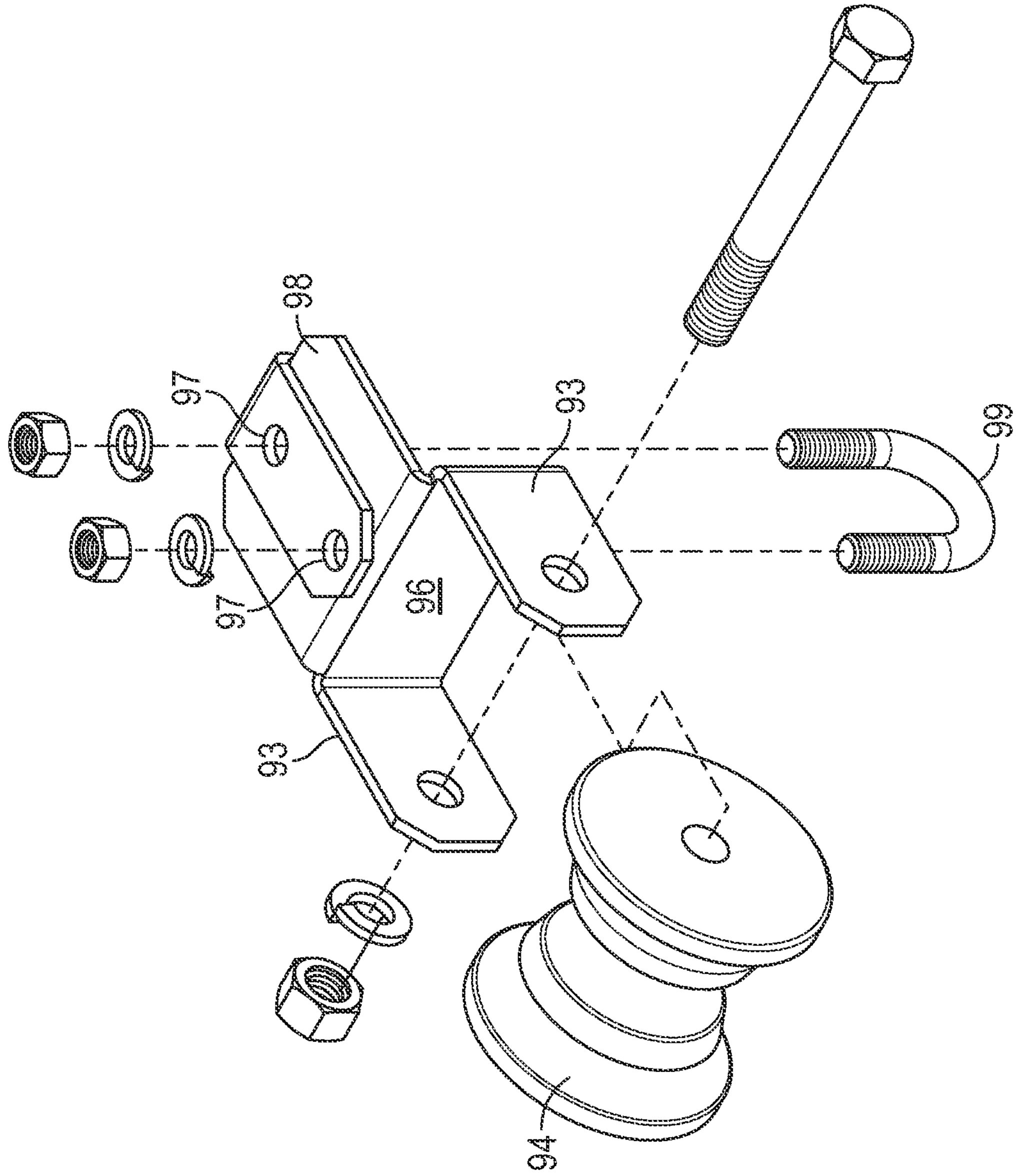
FIG. 16 is an exploded perspective view of the cable guide assembly of FIG. 13.

Referring now to FIGS. 11-12, the eye bolt 74 is secured relative to the horizontal member 70 by using a pair of conventional nuts 73 operatively coupled to the treaded end of the eye bolt and that are configured to allow for the cable to be tensioned to a desired level. In this aspect, it is contemplated that a compression assembly 75 will be positioned between the pair of conventional nuts and a bottom surface of the horizontal member 70. The compression assembly 75 can comprise a plurality of compression washers 77, such as for example and without limitation, conventional Belleville washers, which are configured to compress under a known load. The plurality of compression washers can comprise compression washers having the same or different load ratings. For example, and as illustrated in FIG. 11, the plurality of compression washers can comprise a first pair of opposed compression washers 77' having a lower load rating that are positioned adjacent a second pair of opposed compression washers 77" having a load rating that is higher than the first pair. It is also contemplated that a conventional washer can be positioned between the respective first and second pairs of opposed compression washers.

In one aspect, the compression assembly can be shipped to the user as shown in FIG. 11, with the first pair of opposed compression washers 77' being positioned is stacked relationship with the second pair of opposed compression washers 77", with washers positioned therebetween the first and second pairs of opposed compression washers and at either ends of the first and second pairs of opposed compression washers. Additionally, the pair of conventional nuts 73, comprising bottommost and topmost nuts can be mounted onto the distal end of the threads of the eye bolt.

The cable can be operably tensioned by initially removing the bottommost nut from the threads of the eye bolt. Subsequently, the topmost nut can be tightened until the first and second pairs of opposed compression washers are fully positioned into a compressed position. Subsequently, the topmost nut can be loosened until the second pair of opposed compression washers 77" spread open completely relative to each other and the first pair of opposed compression washers 77' just begin to spread open relative to each other. Next, as shown in FIG. 12, the topmost nut can be tightened until the first pair of opposed compression washers 77' flatten against each other. Now the cable is at the desired tension, which in this example, and not meant to be limiting, is at about 400 ft. lbs. Finally, the removed bottommost nut must be reinstalled on the eye bolt and tightened against the topmost nut to fix the compression assembly in place.

Referring now to FIGS. 13-16, the cable guide 90 can comprise a U-shaped member 92 that defines a pair of spaced legs 93 and a cable guide 94 that is rotatively coupled therebetween respective distal portions of the pair of spaced legs. A base portion 96 of the U-shaped member has a shoulder portion 98 that extends perpendicular to and proximally away from the base portion 96 and is configured to be in contact with a rung of the ladder and defines a pair of spaced openings 97. In operation, the cable guide 90 is coupled to the ladder by positioning the shoulder portion 98 on the top side of the selected rung of the ladder and inserting ends of the U-shaped coupling device 99 into the openings 97 to capture a rung of the ladder between the shoulder portion 98 of the cable guide and coupling device. Once captured, conventional nuts are coupled to the ends of the U-shaped coupling device to secure the cable guide relative to the ladder.

Figure 17:
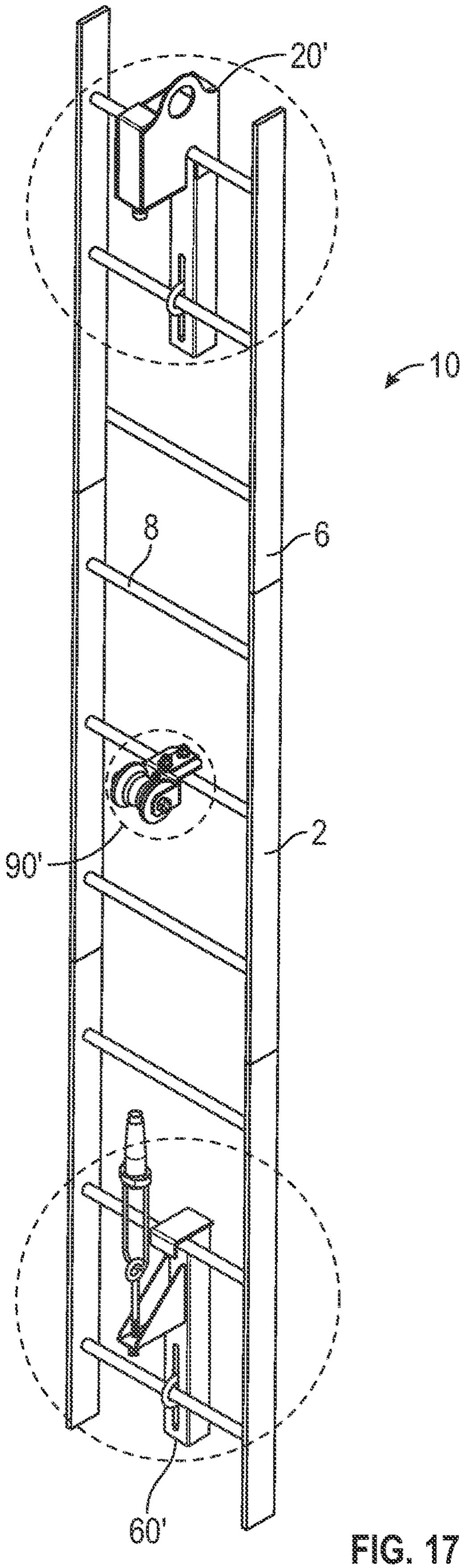
FIG. 17 is a perspective view of a second embodiment of a fall protection system, showing a top bracket assembly, a bottom bracket assembly, and a cable guide mounted thereon a substantially vertical ladder, and showing a tensioned cable extending between the top and bottom bracket assemblies.
Figure 18:
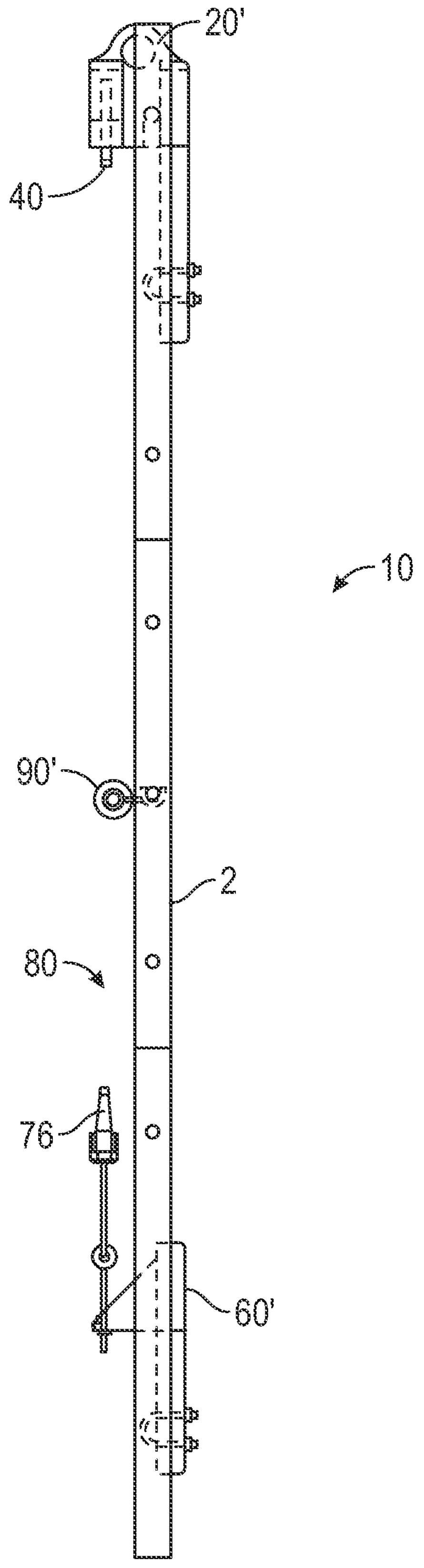
FIG. 18 is a side elevational view of the fall protection system of FIG. 17.
Figure 19:
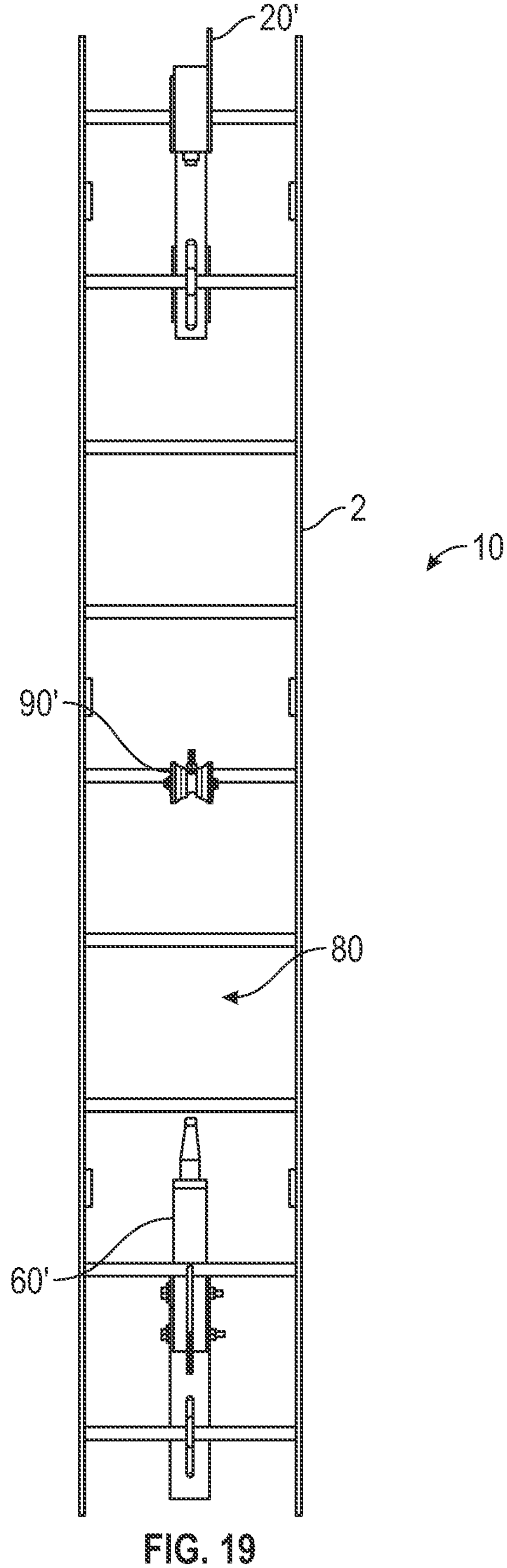
FIG. 19 is a front elevational view of the fall protection system of FIG. 17.
Figure 20:
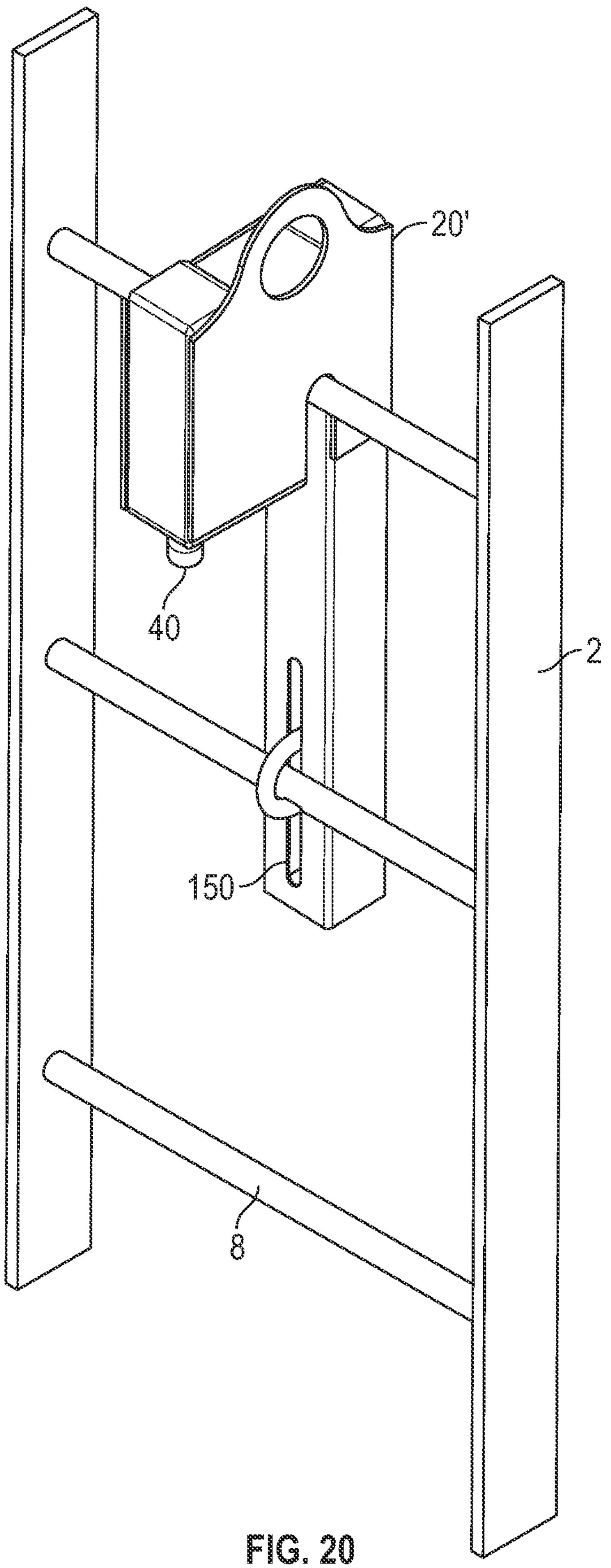
FIG. 20 is a perspective view of the top bracket assembly of FIG. 17 mounted thereon the vertical ladder.
Figure 21:
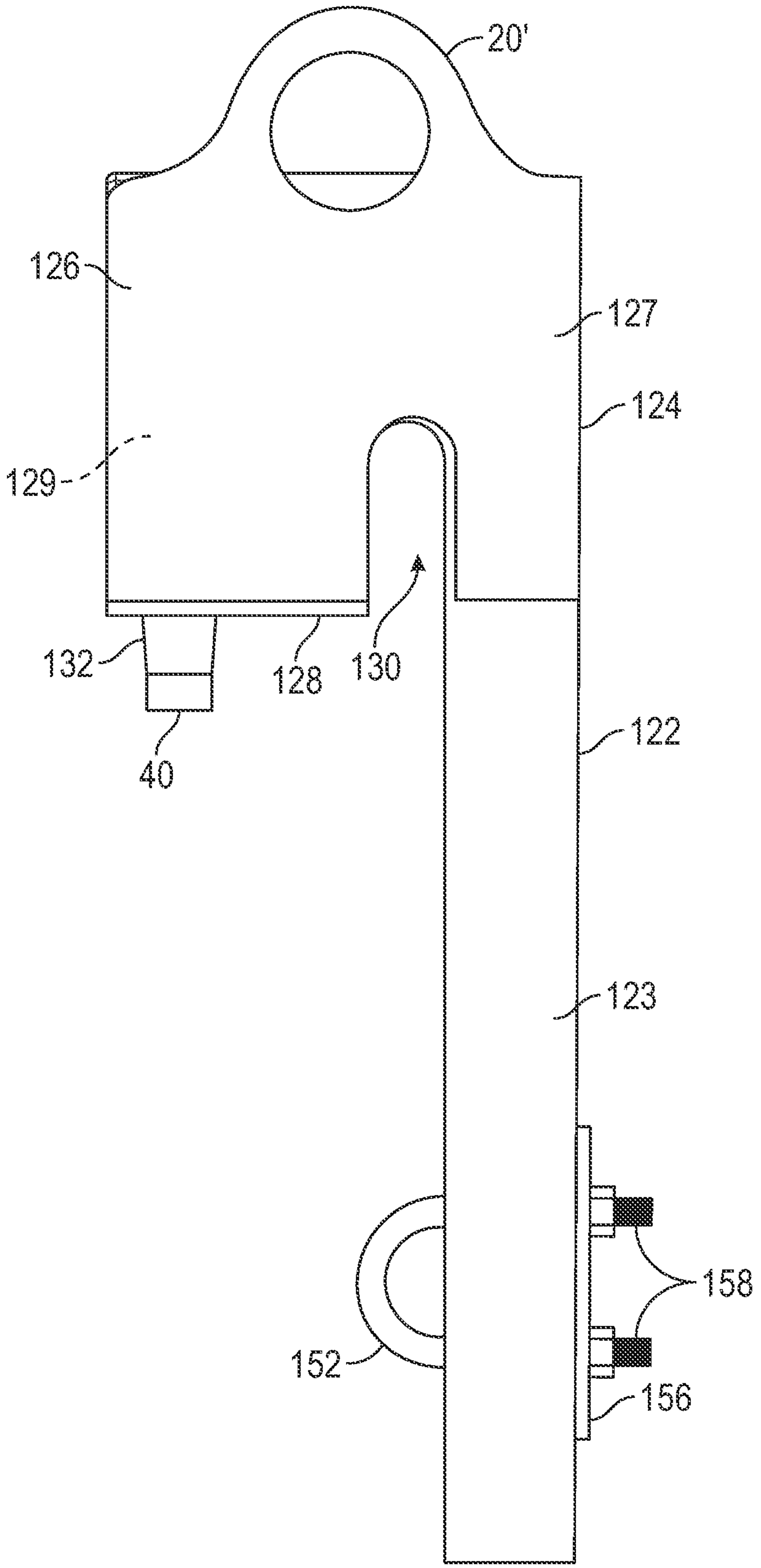
FIG. 21 is a side elevational view of the top bracket assembly of FIG. 20.
Figure 22:
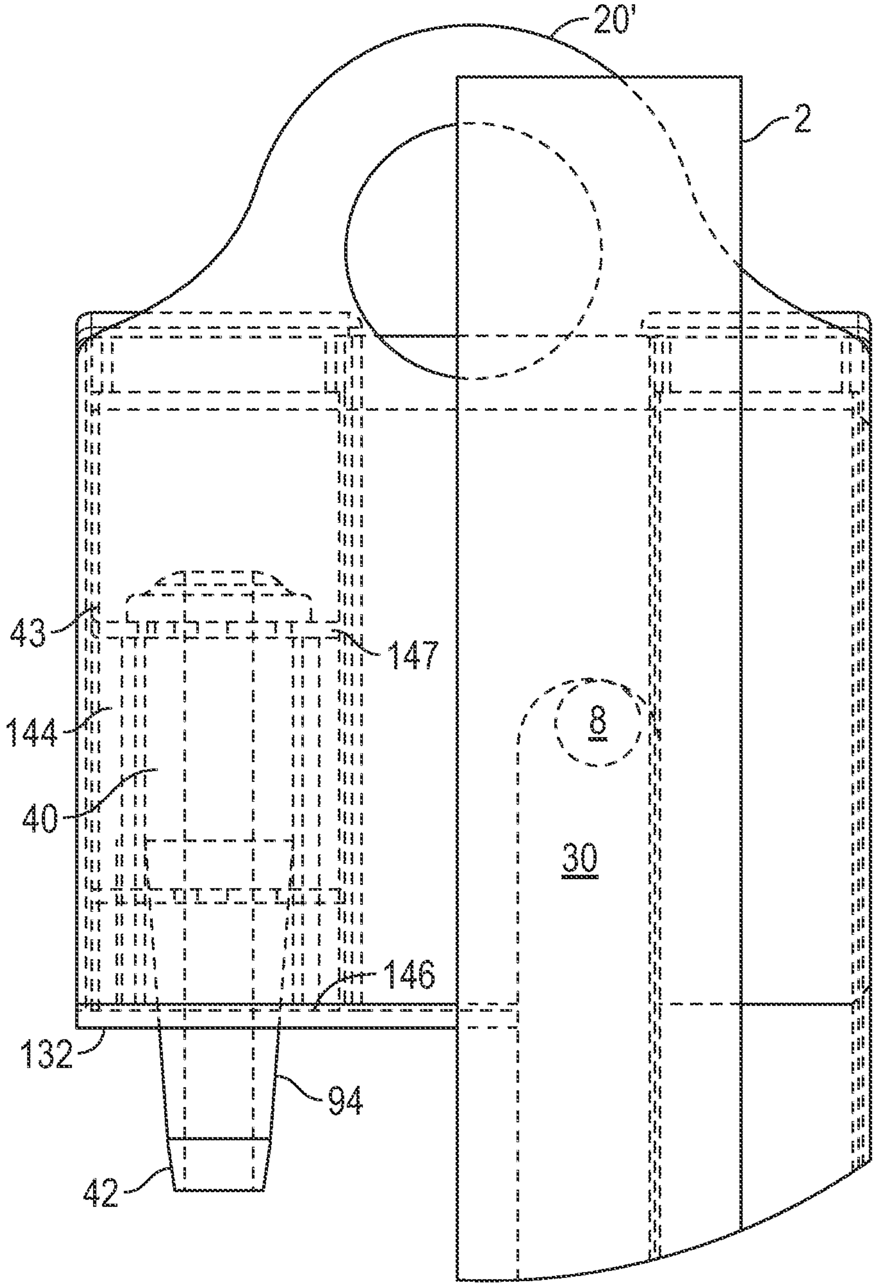
FIG. 22 is a partial transparent side elevational view of the top bracket assembly of FIG. 20.
Figure 23:
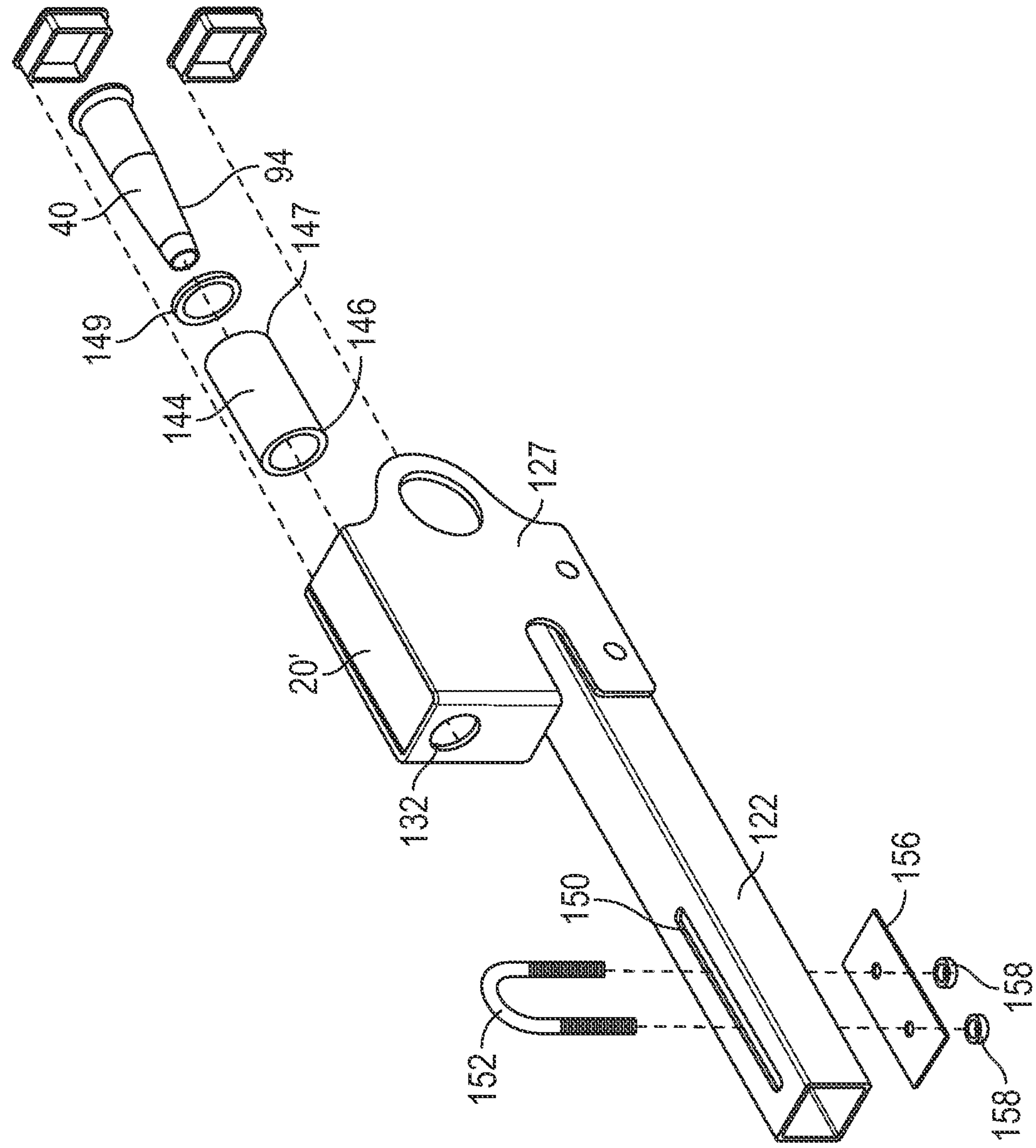
FIG. 23 is an exploded perspective view of the top bracket assembly of FIG. 20.

Referring to FIGS. 17-19, a second embodiment of the fall protection system 10 that is fixedly mountable to a vertical ladder is shown. In this aspect, the top and bottom bracket assemblies 20', 60' are configured to fixedly mount to the ladder and aid in stabilizing the cable that extends under tension therebetween. The top bracket assembly 20' can be mountable to a top portion of the ladder, the spaced bottom bracket assembly 60' can be mountable to a bottom portion of the ladder, and, in used, the cable guide 90' can be mountable to the ladder between the respective top and bottom bracket assemblies.

In one aspect, and as shown in FIGS. 20-23, the top bracket assembly 20' can comprise an elongated vertical member 122 having a lower portion 123 and an upper portion 124 and a horizontal member 126 that has a proximal portion 127 that is integrally coupled to the upper portion 124 of the vertical member. The horizontal member 126 extends outwardly therefrom the upper portion 24 of the vertical member and defines an interior cavity 29 proximate the distal portion of the horizontal member. A bottom surface 128 of the horizontal member 126 defines a slot 130 that extends substantially vertically therein the horizontal member and that is sized and shaped to accept a horizontal rung of the ladder. The bottom surface 128 of the horizontal member further defines a port 132 that communicates with the interior cavity of the horizontal member. Thus, as shown in FIG. 19, it is contemplated that the top bracket assembly member 20' can have an inverted J-shape in cross-section.

In a further aspect, the interior cavity 129 of the horizontal member is configured to accept a first conventional automatic cable connector 40 that includes a tubular housing 42 having an open end into which a cable end can be received. The tubular housing 42 includes a distal tapered exterior surface 94 that can be received within the port 132. In operation, the tubular housing 42 of the conventional automatic cable connector 40 comprises a spring that is configured to continually biases jaw segments toward an interior tapered surface. When a cable end is inserted into the open end of the tubular housing, the cable end moves the jaws away from the interior tapered surface against the bias of the spring, permitting the cable to pass between the jaws. After the cable is inserted, the spring biases the jaw segments into engagement with the tapered surface. Thus, when the cable is then subjected to tension, the jaws are pulled against the tapered surface to firmly grip the cable. Examples of this known type of automatic cable connector 40 are the STRANDVISE® cable termination connectors of MACLEAN POWER SYSTEMS. In this aspect, the top bracket assembly 20' can further comprises a polymer tension tube 144 and a washer 149 that are configured to receive the tubular housing of the first automatic cable connector. The polymer tension tube 144 is positioned within the interior cavity 129 of the horizontal member with the proximal end 146 of the tension tube being in contact with the portions of the horizontal member surrounding the port 132. The washer 149 is positioned proximate the distal end 147 of the tension tube and the distal shoulder 43 of the automatic cable connector 40.

The lower portion 123 of the elongated vertical member 122 can define an elongated slot 150 that extends substantially vertically. This slot is configured to accept the ends of a U-shaped coupling device 152.

In operation, the top bracket assembly 20' is coupled to the ladder by positioning the elongated vertical member 122 on the non-operator side of the ladder and lowering the top bracket assembly until a horizontal rung is seated within the slot 130 defined in the bottom surface 128 of the horizontal member 126. This insures that any loading imposed on the top bracket assembly during operation will be transferred to the ladder and will not result in vertical loading on any other coupling means of the top bracket assembly to the ladder. Subsequently, the U-shaped coupling device 152 can be inserted into the slot 150 to capture a rung of the ladder between the coupling device 152 and the exterior surface of the lower portion 123 of the elongated vertical member 122. Once captured, a backing plate 156 is placed over the ends of the U-shaped coupling device and conventional nuts 158 are coupled to the ends of the U-shaped coupling device to secure the top bracket assembly relative to the ladder.

Figure 24:
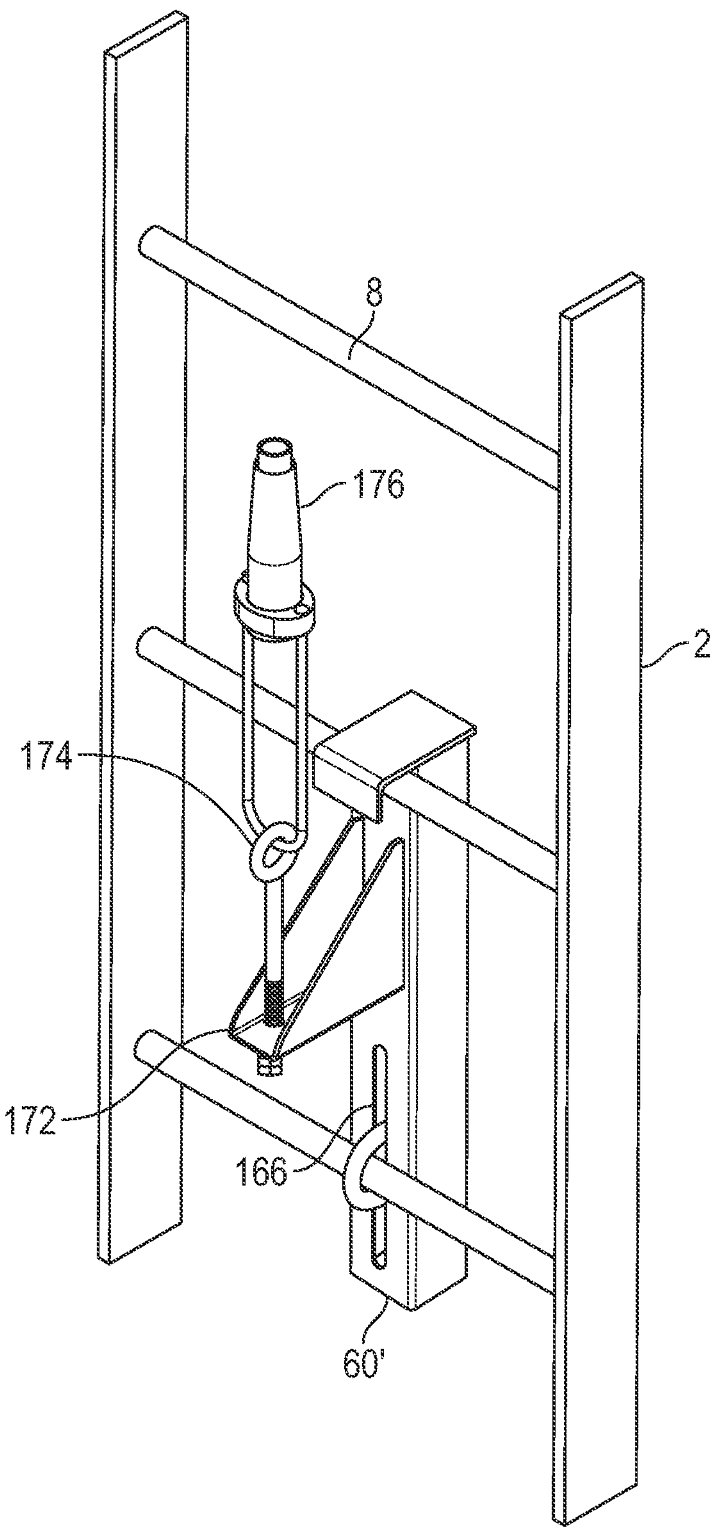
FIG. 24 is a perspective view of the bottom bracket assembly of FIG. 17 mounted thereon the vertical ladder.
Figure 25:
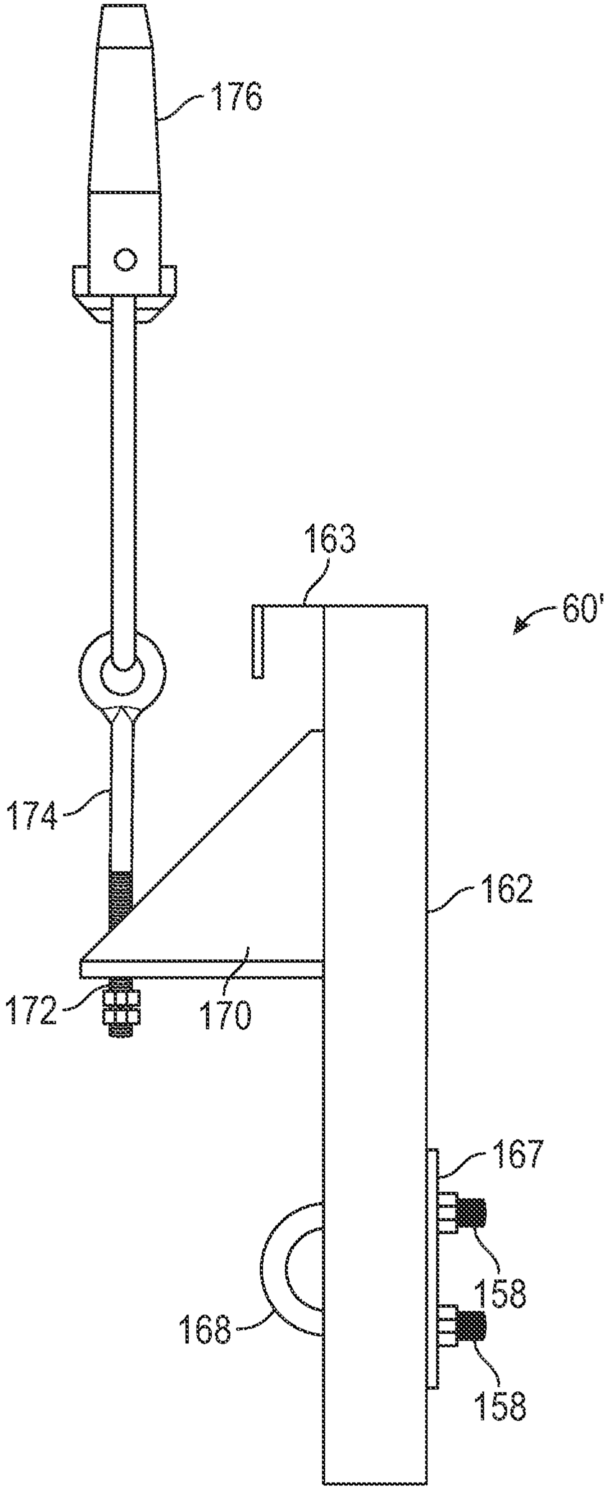
FIG. 25 is a side elevational view of the bottom bracket assembly of FIG. 24.
Figure 26:
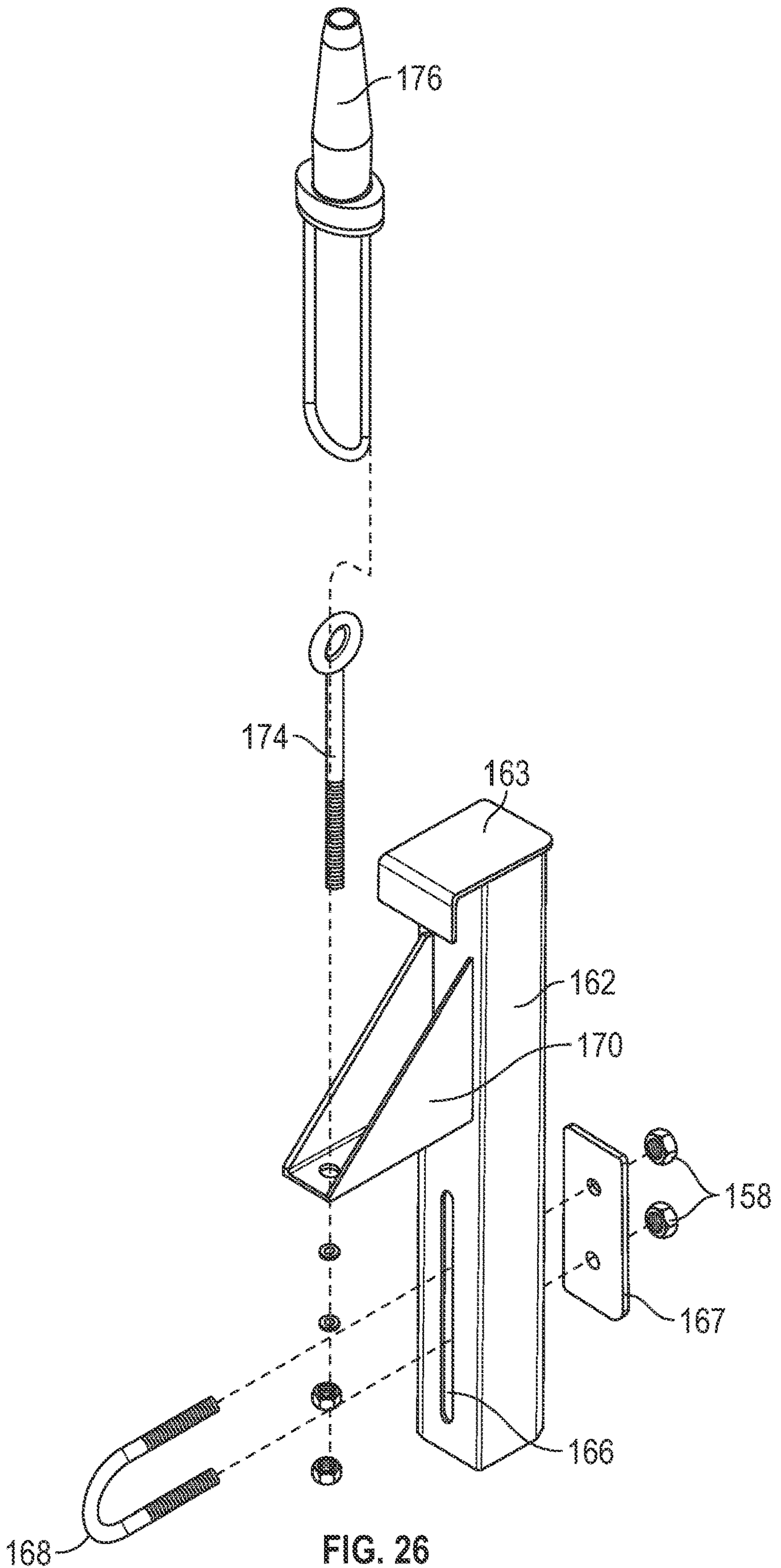
FIG. 26 is an exploded perspective view of the bottom bracket assembly of FIG. 24.

Referring now to FIGS. 24-26, the bottom bracket assembly 60' can comprise an elongated vertical member 162 and a horizontal member 170 that that is integrally coupled to the vertical member. The horizontal member 170 extends outwardly therefrom the vertical member 162 and defines an opening 172 that is configured to accept an eye bolt 174. A horizontally extending lip 163 can extend outwardly can be connected to the upper end of the vertical member 162 and form an inverted J-shape in cross-section to allow the bottom bracket assembly 160 to hang from a rung of the ladder. In a further aspect, a second conventional automatic cable connector 176, such as described above, can be conventionally coupled to the distal end of the eyebolt 174.

The lower portion of the elongated vertical member 162 can define an elongated slot 166 that extends substantially vertically. This slot 166 is configured to accept the ends of a U-shaped coupling device 168.

In operation, the bottom bracket assembly 60' is coupled to the ladder by positioning the elongated vertical member 162 on the non-operator side of the ladder and lowering the bottom bracket assembly until a horizontal rung is seated within lip 163. Subsequently, the U-shaped coupling device 168 can be inserted into the slot 166 to capture a rung of the ladder between the coupling device 168 and the exterior surface of the lower portion of the elongated vertical member 162. Once captured, a backing plate 167 is placed over the ends of the U-shaped coupling device and conventional nuts 158 are coupled to the ends of the U-shaped coupling device to secure the bottom bracket assembly relative to the ladder.

Figure 27:
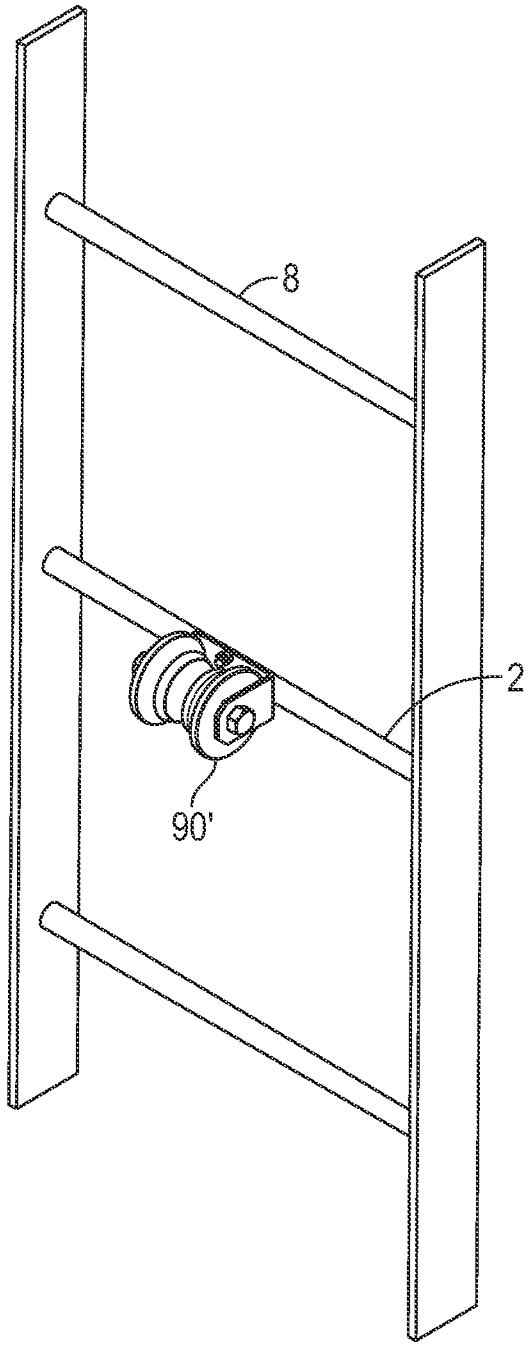
FIG. 27 is a perspective view of the cable guide of FIG. 17 mounted thereon the vertical ladder.
Figure 28:
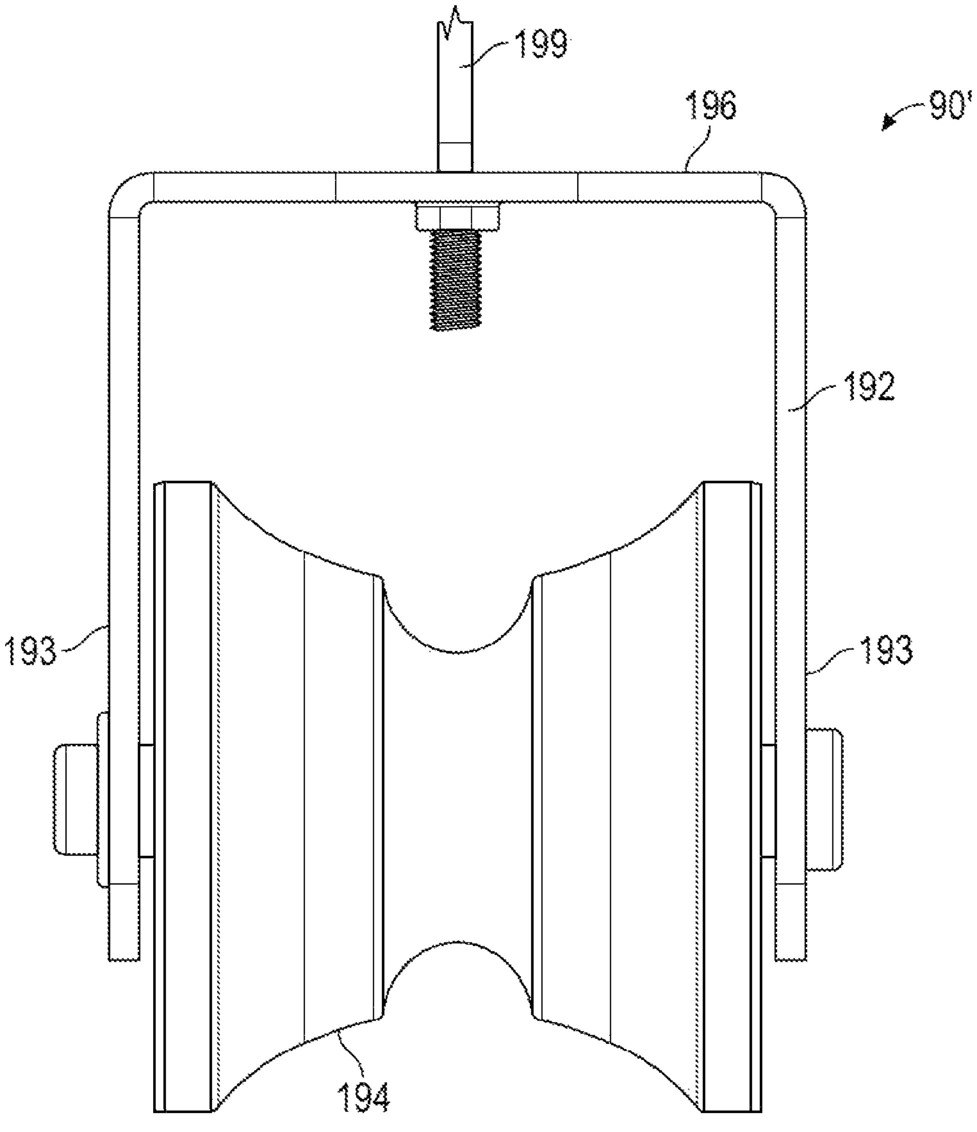
FIG. 28 is a top elevational view of the cable guide assembly of FIG. 27.
Figure 29:
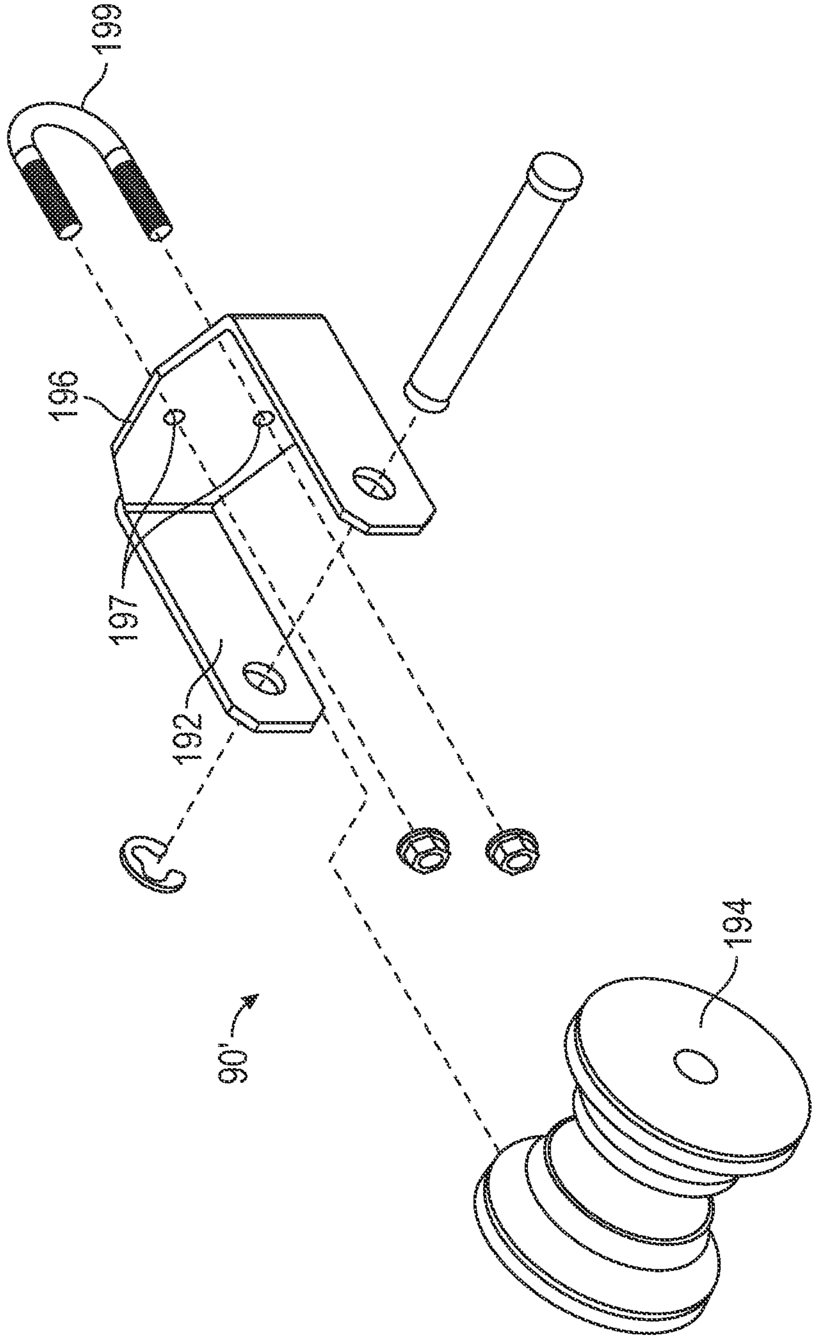
FIG. 29 is an exploded perspective view of the cable guide of FIG. 27.

Referring now to FIGS. 27-29, the cable guide 90' can comprise a U-shaped member 192 that defines a pair of spaced legs 193 and a cable guide 194 that is rotatively coupled therebetween respective distal portions of the pair of spaced legs. A base portion 196 of the U-shaped member is configured to be in contact with a rung of the ladder and defines a pair of spaced openings 197. In operation, the cable guide 190 is coupled to the ladder by positioning the base portion 196 on the operator side of the ladder and inserting ends of the U-shaped coupling device 199 into the openings 197 to capture a rung of the ladder between the base portion 196 of the cable guide and coupling device. Once captured, conventional nuts are coupled to the ends of the U-shaped coupling device to secure the cable guide relative to the ladder.

Figure 30:
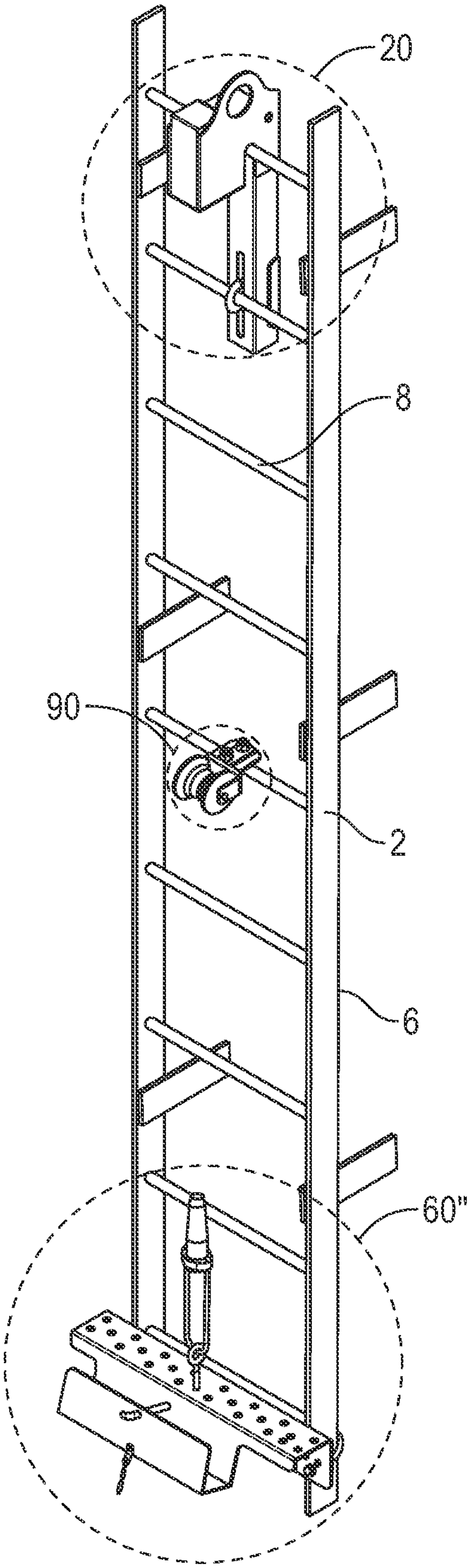
FIG. 30 is a perspective view of a fall protection system, showing a top bracket assembly, an alternative embodiment of a bottom bracket assembly, and a cable guide mounted thereon a substantially vertical ladder, and showing a tensioned cable extending between the top and bottom bracket assemblies.
Figure 31:
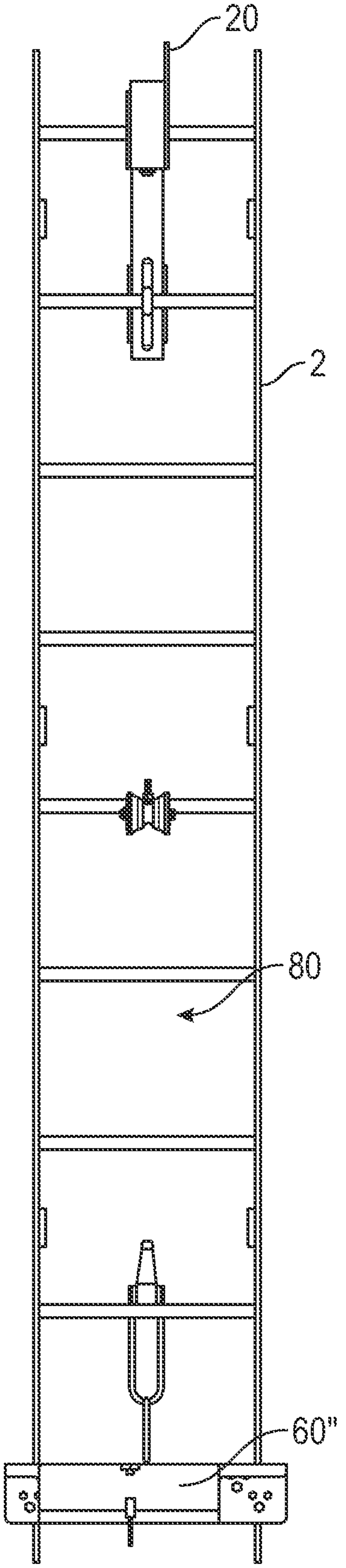
FIG. 31 is a front elevational view of the fall protection system of FIG. 30.
Figure 32:
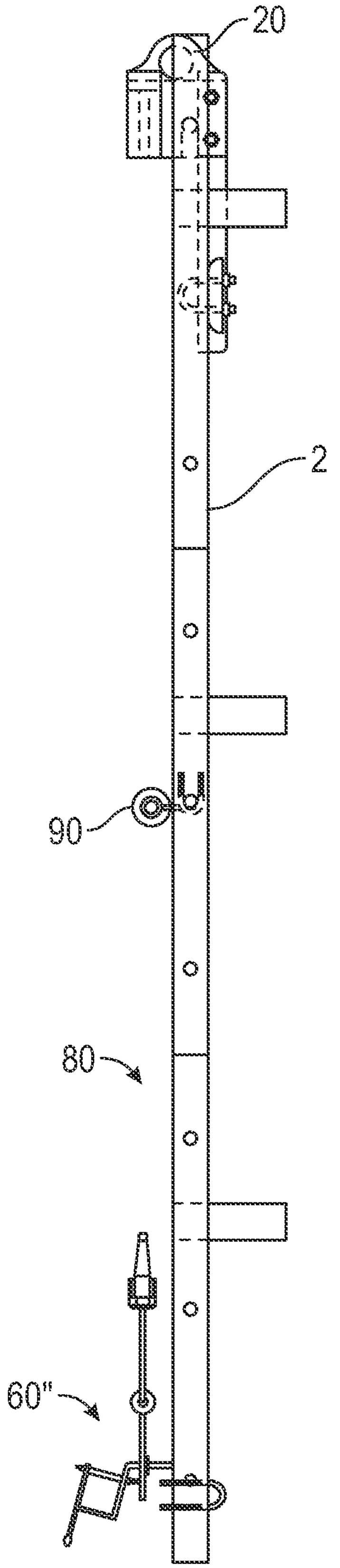
FIG. 32 is a side elevational view of the fall protection system of FIG. 30.
Figure 33:
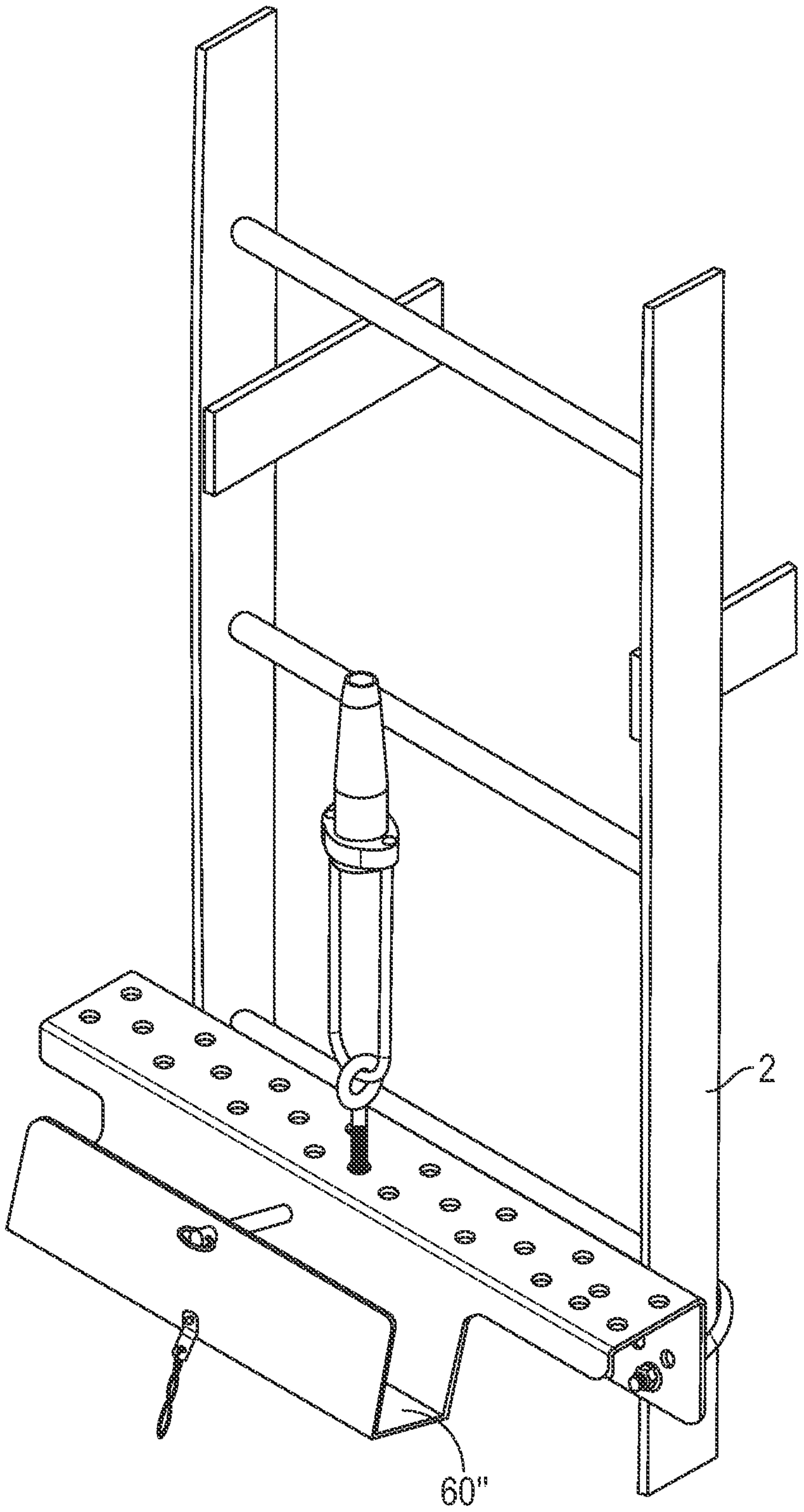
FIG. 33 is a front perspective view of the bottom bracket assembly of FIG. 30 mounted thereon the bottom portion of the ladder.
Figure 34:
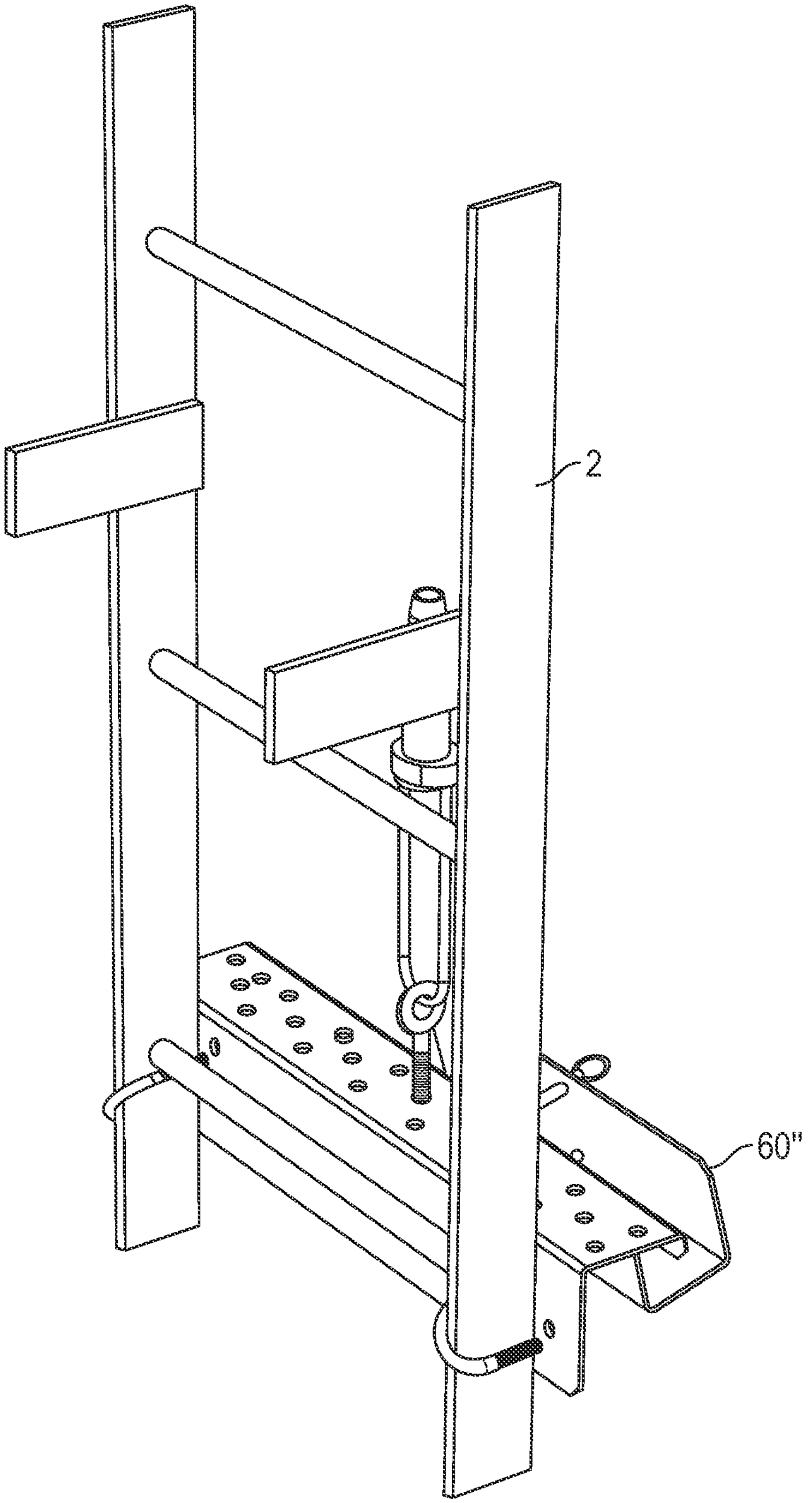
FIG. 34 is a rear perspective view of the bottom bracket assembly of FIG. 30 being mounted to a portion of a substantially vertical ladder.
Figure 35:
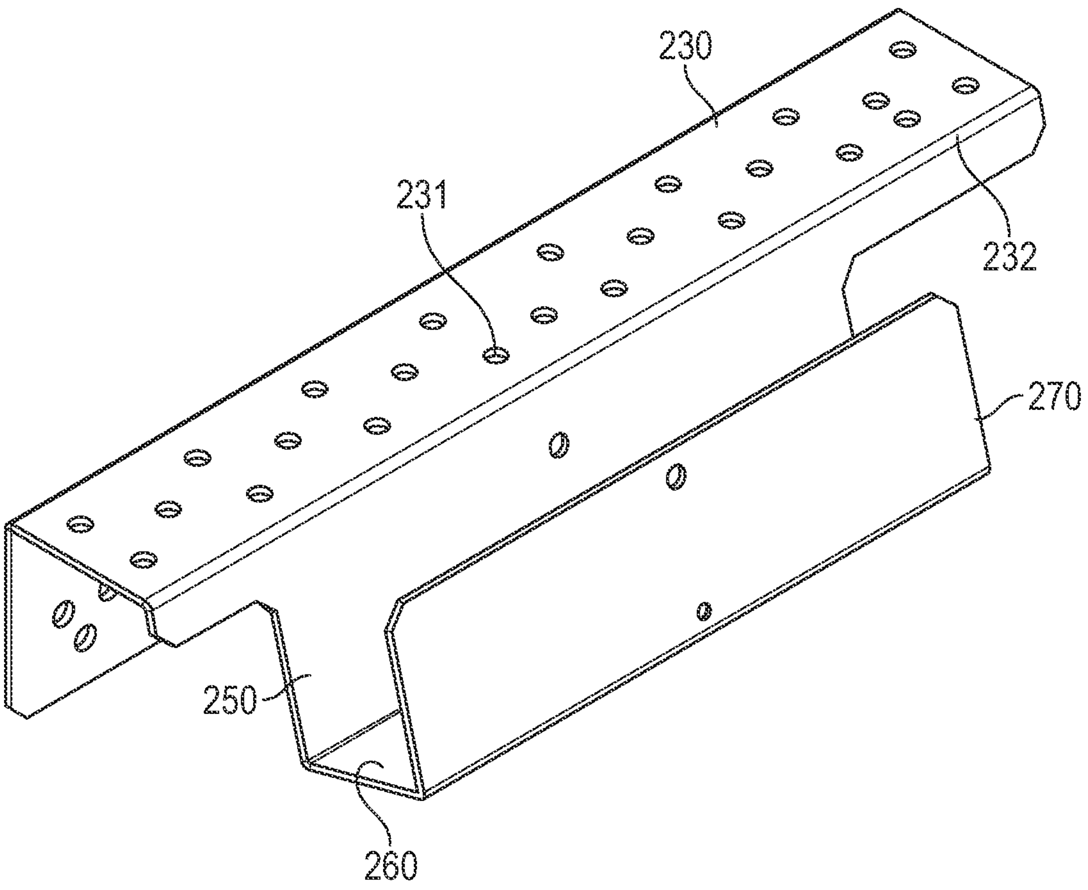
FIG. 35 is a perspective view of the bottom bracket assembly of FIG. 33.
Figure 36:
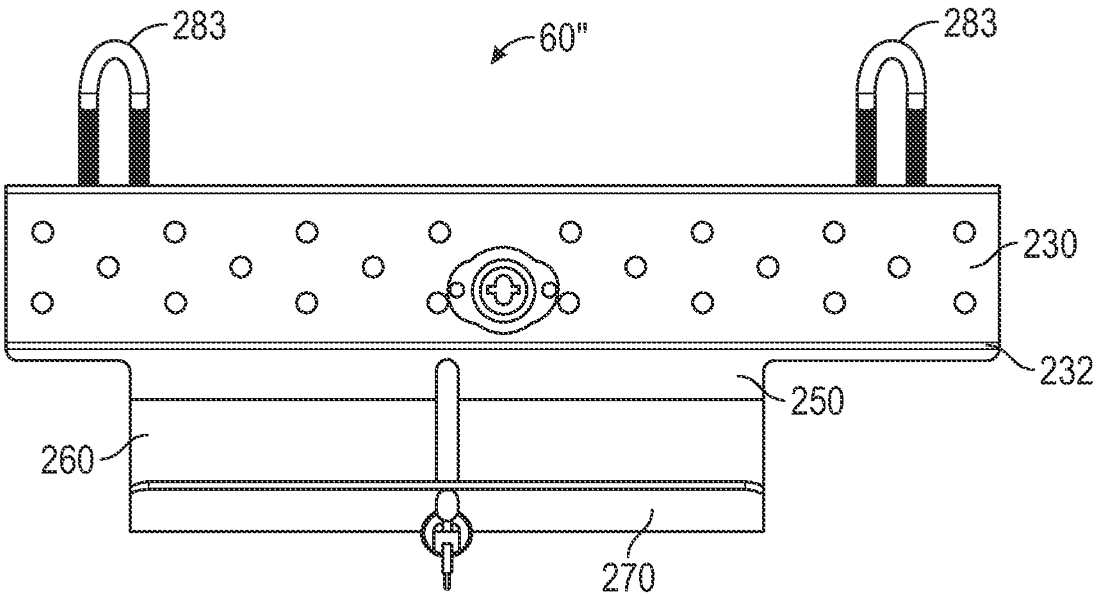
FIG. 36 is a top elevational view of the bottom bracket assembly of FIG. 35.
Figure 37:
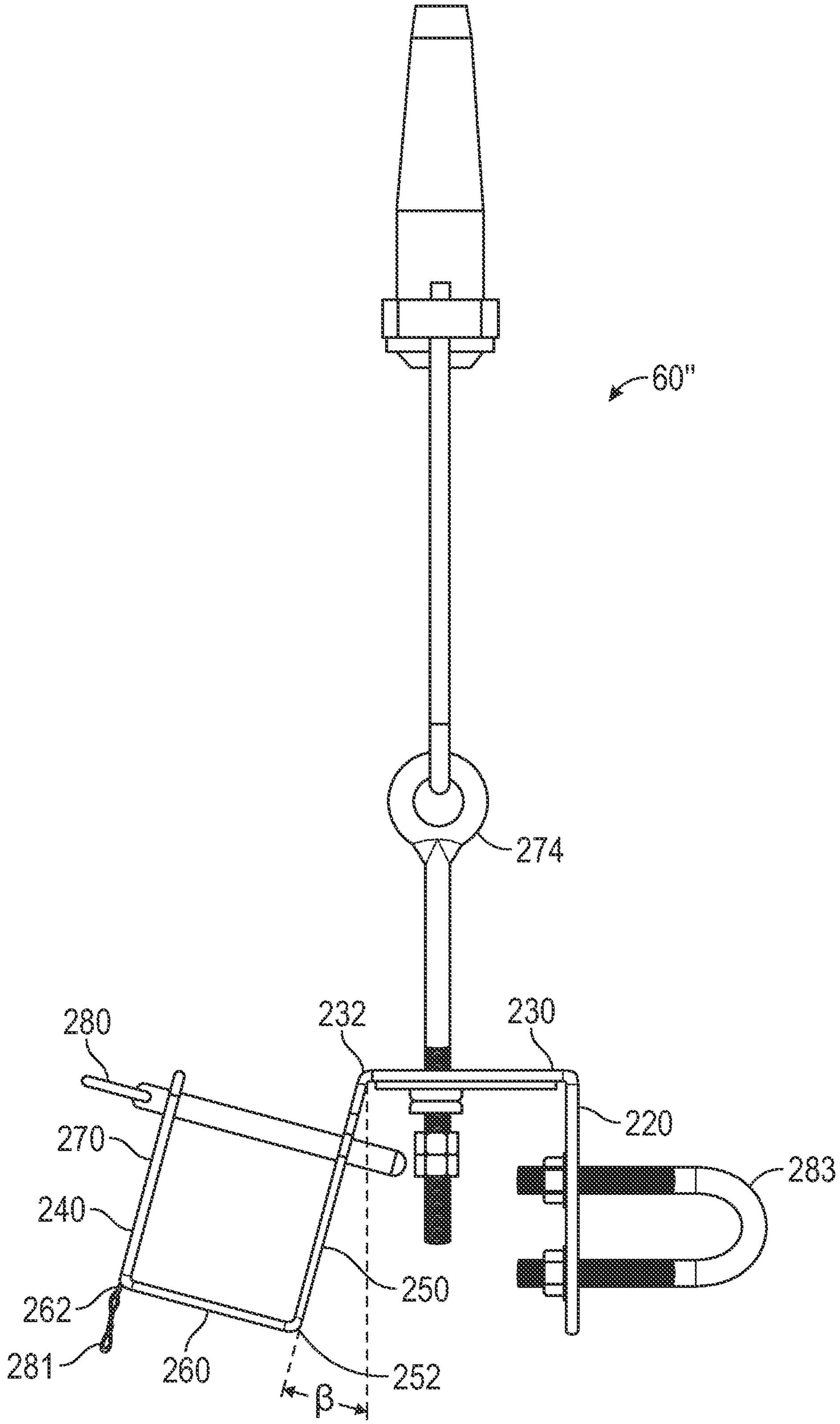
FIG. 37 is a side elevational view of the bottom bracket assembly of FIG. 35.
Figure 38:
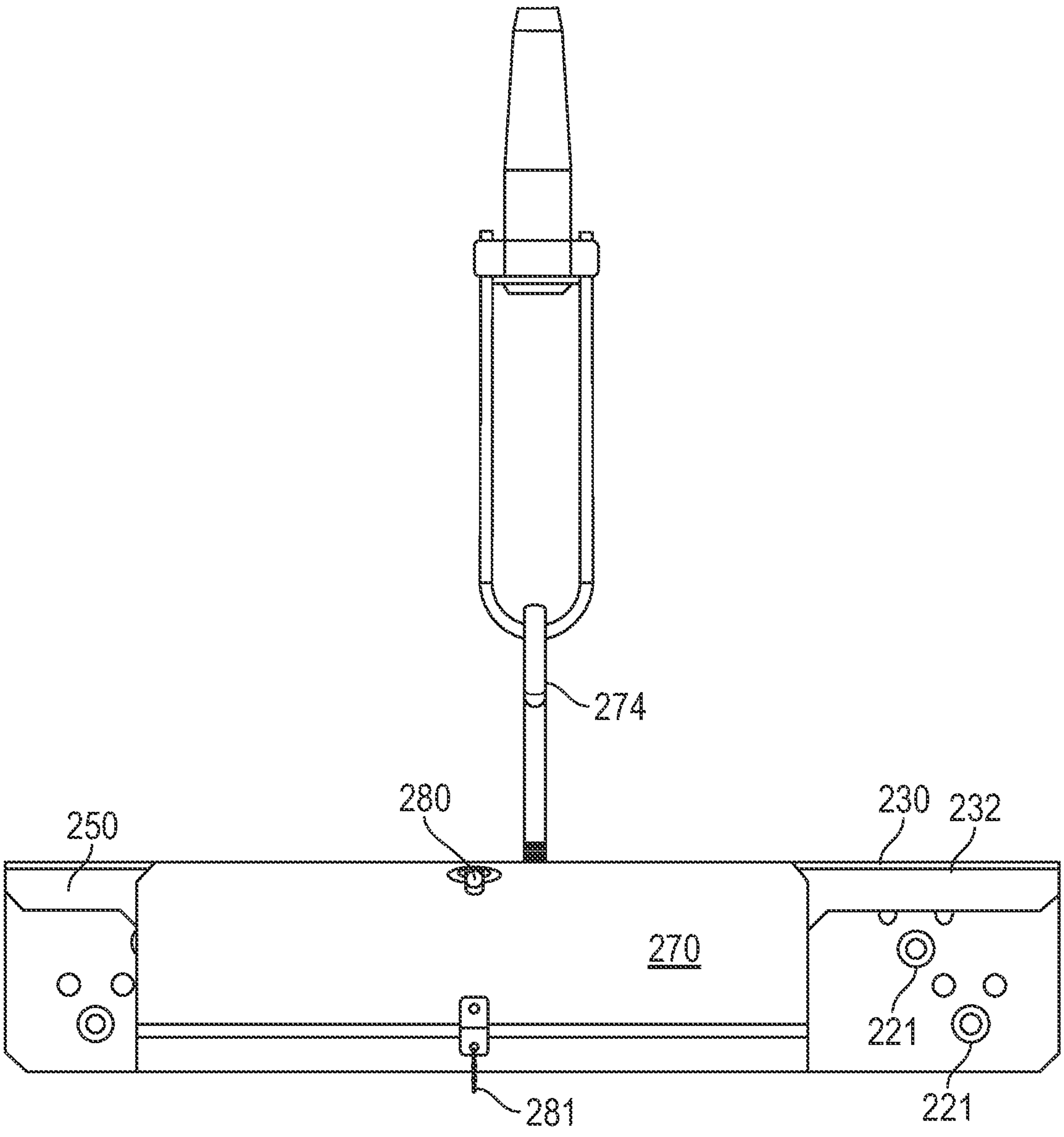
FIG. 38 is a front elevational view of the bottom bracket assembly of FIG. 35.

FIG. 30 is a perspective view of an alternative embodiment of the fall protection system 10, showing a top bracket assembly 20, an alternative embodiment of a bottom bracket assembly 60", and a cable guide 90 mounted thereon a substantially vertical ladder, and showing a tensioned cable extending between the top and bottom bracket assemblies.

Referring to FIG. 30-39, an optional embodiment of the bottom bracket assembly 60" can comprise a support member 220, a spacing member 230, and a trough member 240. The trough member 240 can be configured to operatively and selectively receive a rung 8 of the ladder 2. In this aspect, the trough member 240 can comprise a first planer member 250, an integrally coupled second planer member 260, and an integrally coupled third planer member 270. The first planer member 250 can be coupled to the distal edge 232 of the spacing member 230 and can extend downwardly away from a juncture of the first planer member and the spacing member at an acute angle β relative to the support member. The second planer member 260 can be coupled to a portion 254 of a distal edge 252 of the first planer member 250 and can extend outwardly transverse to the first planer member 250. Further, the third planer member 270 can be coupled to a distal edge 262 of the second planer member 260 and can extend transverse to the second planer member 260. In one aspect, the first planer member 250 and the third planer member 270 can be positioned in planes that are substantially parallel to each other. Thus, it is contemplated that the trough member 240 can have a U-shape in cross-section. As one skilled in the art will appreciate upon review of the figures, it is contemplated that the trough member 240 is configured to receive a rung of the ladder.

In this optional aspect, the bottom bracket assembly 60" further comprises a quick release pin 280 that is configured to be received in a pair of opposed ports defined in the upper portion of the opposing walls (the first planer member 250 and the third planer member 270) of the trough member 240 to secure a ladder positioned therein the trough member 240. In this aspect, it is also contemplated that a lanyard can be coupled to a portion of the exterior of the first planar member 250 and the quick release pin 280 to ensure that the quick release pin is secured relative to the bottom bracket assembly.

It is contemplated that a plurality of fasteners, in the form of conventional U-shaped bolts 283, can be used to fixedly mount the optional embodiment of the bottom bracket assembly 60" to the pair of spaced vertical legs 6 of the underlying substantially vertical ladder, via the plurality of openings 221 defined in the support planer member of the bottom bracket assembly 60".

Figure 39:
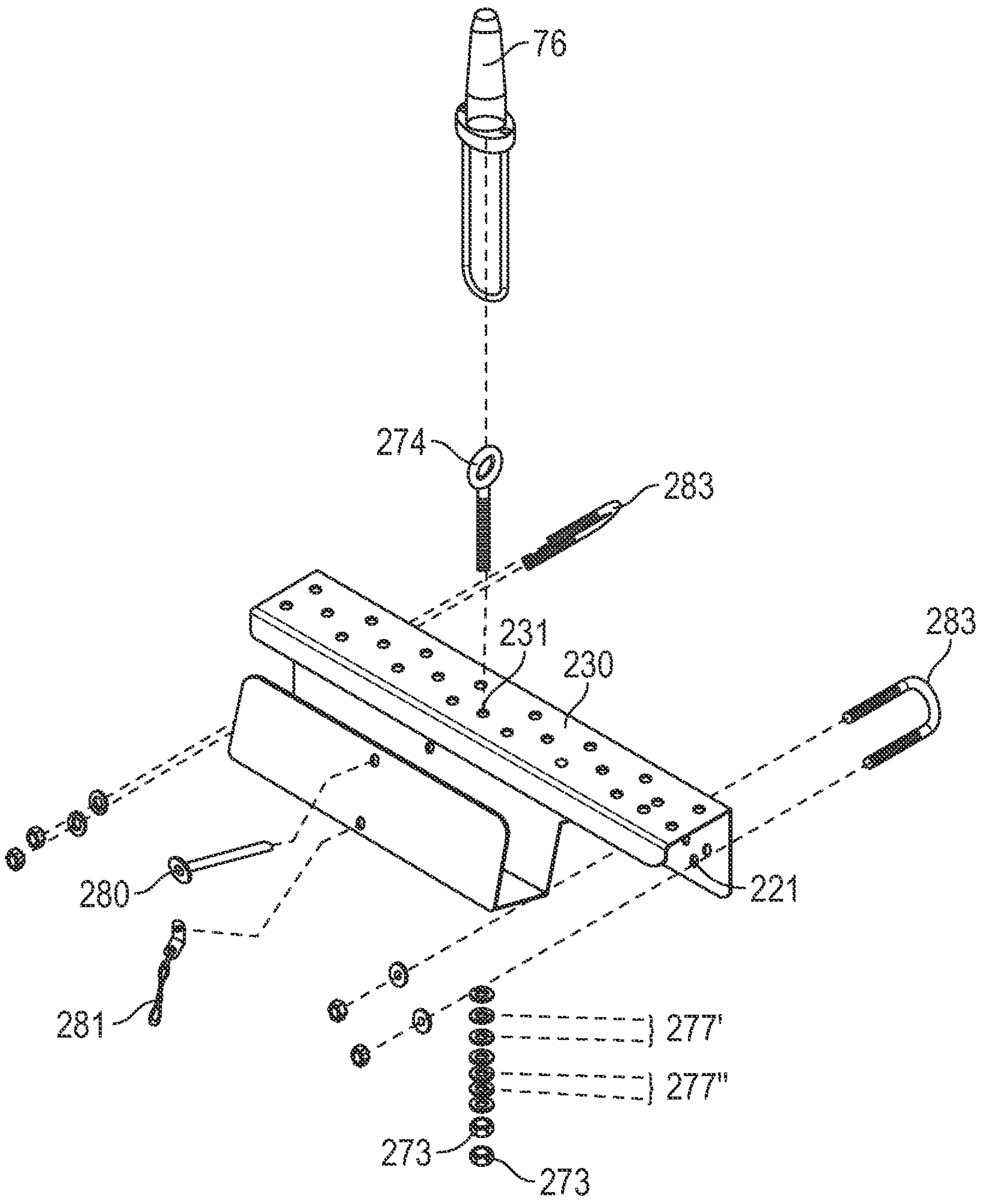
FIG. 39 is an exploded perspective view of the bottom bracket assembly of FIG. 35.

Referring now to FIG. 39, the spacing member 230 defines an opening 231 that is configured to operatively accept an eye bolt 274 having a shaft with a threaded end. In one aspect, the eye bolt 274 can be secured relative to the horizontal spacing member 230 by using a pair of conventional nuts 273 that are configured to allow for the cable to be tensioned to a desired level. In this aspect, it is contemplated that a compression assembly 275 will be positioned between the pair of conventional nuts and a bottom surface of the spacing member 230. The compression assembly 275 can comprise a plurality of compression washers 277, such as for example and without limitation, conventional Belleville washers, which are configured to compress under a known load. The plurality of compression washers can comprise compression washers having the same or different load ratings. For example, the plurality of compression washers can comprise a first pair of opposed compression washers 277' having a lower load rating that are positioned adjacent a second pair of opposed compression washers 277" having a load rating that is higher than the first pair. It is also contemplated that a conventional washer can be positioned between the respective first and second pairs of opposed compression washers and between the uppermost pair of opposed compression washers and the bottom surface of the spacing member 230.

Figure 40:
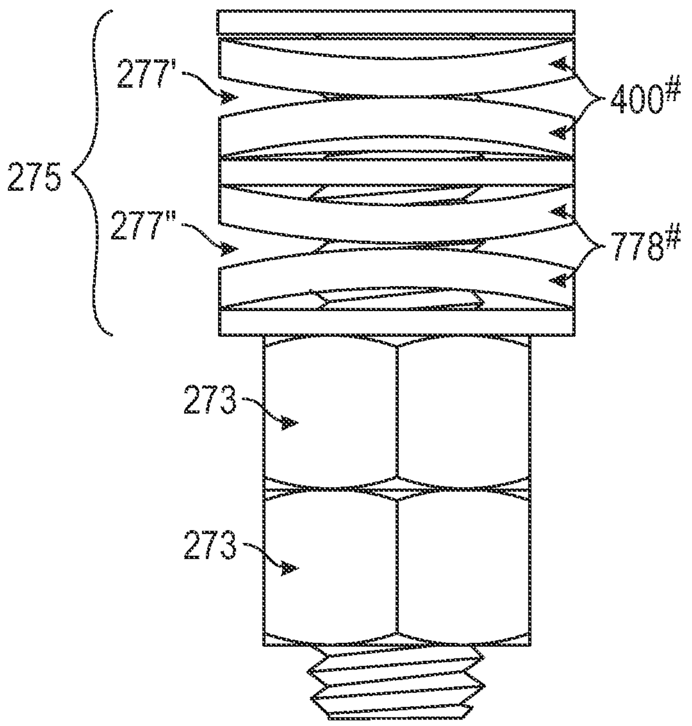
FIG. 40 is an enlarged side elevational view of a portion of the bottom bracket assembly of FIG. 33 showing the use of a plurality of Belleville washers in a pretightened position.
Figure 41:
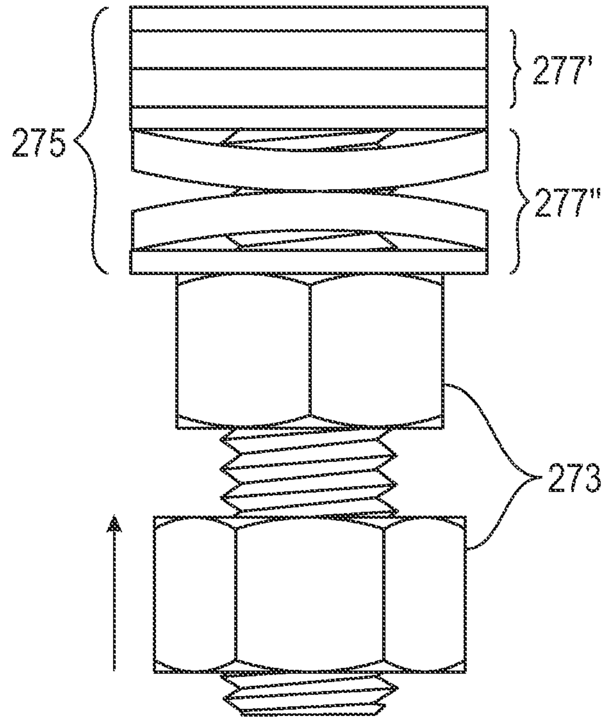
FIG. 41 is a partial side elevational view of a portion of the bottom bracket assembly of FIG. 33, showing the plurality of Belleville washers positioned to tension the attached cable to the desired level.

Referring now to FIGS. 40-41, the compression assembly can be shipped to the user such that the first pair of opposed compression washers 277' are positioned is stacked relationship with the second pair of opposed compression washers 277", with washers positioned therebetween the first and second pairs of opposed compression washers and at either ends of the first and second pairs of opposed compression washers. Additionally, the pair of conventional nuts 273, comprising bottommost and topmost nuts can be mounted onto the distal end of the threads of the eye bolt.

The cable can be operably tensioned by initially removing the bottommost nut from the threads of the eye bolt. Subsequently, the topmost nut can be tightened until the first and second pairs of opposed compression washers are fully positioned into a compressed position. Next, the topmost nut can be loosened until the second pair of opposed compression washers 277" spread open completely relative to each other and the first pair of opposed compression washers 277' just begin to spread open relative to each other. As shown in FIG. 41, the topmost nut can subsequently be tightened until the first pair of opposed compression washers 277' flatten against each other. Now the cable is at the desired tension, which in this example, and not meant to be limiting, is at about 400 ft. lbs. Finally, the removed bottommost nut must be reinstalled on the eye bolt and tightened against the topmost nut to fix the compression assembly in place.

It is contemplated that the cable 80 can be conventionally coupled to the respective conventional first automatic cable connector of the top bracket assembly and second automatic cable connector of the bottom bracket assembly and can be tensioned by drawing the eye bolt of the bottom bracket assembly downwards relative to the bottom bracket assembly. In one exemplary aspect, it is contemplated that a described conventional force crushable washer(s) can be used between the nut(s) being coupled to the eyebolt and the bottom surface of the horizontal member of the bottom bracket assembly to insure that the cable is tensioned to the desired level. When tensioned, the cable will extend between the respective conventional automatic cable connector of the top bracket assembly and of the bottom bracket assembly and will ride therein the cable guide.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

What is claimed is:

1. A fall protection system that is fixedly mountable to a vertical ladder having a pair of spaced vertical legs and a plurality of spaced transversely mounted rungs, comprising:

a top bracket assembly configured to be mountable to a rung on the top portion of the ladder, wherein the top bracket assembly comprises:

an elongated vertical member having a lower portion and an upper portion; and a horizontal member having a proximal portion that is integrally coupled to the upper portion of the vertical member, wherein the horizontal member extends outwardly therefrom the upper portion of the vertical member and defines an interior cavity proximate a distal portion of the horizontal member, wherein a bottom surface of the horizontal member defines a slot that extends substantially vertically in the horizontal member and that is sized and shaped to accept a rung of the ladder, wherein the top bracket assembly has an inverted J-shape in cross-section;

a bottom bracket assembly configured to be mountable to a bottom portion of the ladder, wherein the bottom bracket assembly comprises:

a support member;

an eye bolt;

a horizontal spacing member coupled to a first edge of the support member, wherein the spacing member is positioned is a plane that is substantially parallel to a plane of a rung of the ladder, and wherein the spacing member defines an opening that is configured to operatively accept the eye bolt;

a trough member coupled to a proximal edge of the spacing member, the trough member being configured to be receive a rung of a second, displaceable ladder; and a second cable connector operable coupled to the eye bolt, wherein the second cable connector comprises means for grasping an end portion of the cable when the cable is subjected to tension; and a cable extending therebetween portions of the top bracket assembly and the bottom bracket assembly, wherein the cable is operably coupled to the respective top and bottom bracket assemblies under a desired tension load sufficient to space the cable from a plane of the ladder.

2. The fall protection system of claim 1, wherein fall protection system further comprises a cable guide that is configured to be mountable to a rung of the ladder between the respective top and bottom bracket assembly.

3. The fall protection system of claim 1, wherein the bottom surface of the horizontal member of the top bracket assembly further defines a port that communicates with the interior cavity of the horizontal member of the top bracket assembly.

4. The fall protection system of claim 3, wherein the port of the horizontal member of the top bracket assembly is configured to accept a first cable connector, wherein the first cable connector comprises means for grasping an end portion of the cable when the cable is subjected to tension.

5. The fall protection system of claim 1, wherein the lower portion of the elongated vertical member of the top bracket assembly defines an elongated slot that extends substantially vertically and is configured to accept the ends of a U-shaped coupling device, and wherein the U-shaped coupling device is configured to be insertable into the slot to capture a rung of the ladder between the coupling device and the exterior surface of the lower portion of the elongated vertical member.

6. The fall protection system of claim 1, wherein the support member defines a plurality of spaced openings, the plurality of spaced openings defining a first pair of staggered openings and a second pair of staggered openings, the respective first and second pairs of staggered openings being spaced to overlie portions of the spaced vertical legs of the vertical ladder, wherein each of the respective first and second pairs of staggered openings is configured to accept the ends of a U-shaped coupling device, and wherein the U-shaped coupling device is configured to capture a portion of the underlying spaced vertical legs of the vertical ladder rung of the ladder between the coupling device and the exterior surface of the support member.

7. The fall protection system of claim 1, wherein the eye bolt is secured relative to the horizontal spacing member of the bottom bracket assembly by a compression assembly positioned between a least one nut operatively received onto to a threaded end of a shaft of the eye bolt and a bottom surface of the horizontal spacing member.

8. The fall protection system of claim 7, wherein the compression assembly comprises a plurality of compression washers that are operatively received onto the shaft of the eye bolt and are configured to compress under a known load.

9. The fall protection system of claim 8, wherein the plurality of compression washers comprise compression washers having at least two different load ratings.

10. The fall protection system of claim 9, wherein the plurality of compression washers comprises a first pair of opposed compression washers having a lower load rating that are positioned adjacent a second pair of opposed compression washers having a load rating that is higher than the first pair.

11. The fall protection system of claim 10, wherein a washer is positioned between the respective first and second pairs of opposed compression washers and between the uppermost pair of opposed compression washers and the bottom surface of the horizontal spacing member of the bottom bracket assembly.

12. The fall protection system of claim 1, wherein the trough member further comprises:

a first planer member, wherein the first planer member is coupled to a distal edge of the spacing member and extends downwardly away from a juncture of the first planer member and the spacing member at an acute angle β relative to the support member;

a second planer member, wherein the second planer member is coupled to a portion of a distal edge of the first planer member and extends outwardly transverse to the first planer member; and a third planer member, wherein the third planer member is coupled to a distal edge of the second planer member and extends transverse to the second planer member.

13. The fall protection system of claim 12, wherein the first planer member and the third planer member are positioned in planes that are substantially parallel to each other, and wherein the trough member has a U-shape in cross-section.

14. A fall protection system that is fixedly mountable to a vertical ladder having a pair of spaced vertical legs and a plurality of spaced transversely mounted rungs, comprising:

a top bracket assembly configured to be mountable to a rung on the top portion of the ladder, wherein the top bracket assembly comprises:

an elongated vertical member having a lower portion and an upper portion; and a horizontal member having a proximal portion that is integrally coupled to the upper portion of the vertical member, wherein the horizontal member extends outwardly therefrom the upper portion of the vertical member and defines an interior cavity proximate a distal portion of the horizontal member, wherein a bottom surface of the horizontal member defines a slot that extends substantially vertically in the horizontal member and that is sized and shaped to accept a rung of the ladder, wherein the top bracket assembly has an inverted J-shape in cross-section;

a bottom bracket assembly configured to be mountable to a bottom portion of the ladder, wherein the bottom bracket assembly comprises:

a support member;

an eye bolt;

a horizontal spacing member coupled to a first edge of the support member, wherein the spacing member defines an opening that is configured to operatively accept the eye bolt;

a trough member coupled to a proximal edge of the spacing member, the trough member being configured to be receive a rung of a second, displaceable ladder; and a second cable connector operable coupled to the eye bolt, wherein the second cable connector comprises means for grasping an end portion of the cable when the cable is subjected to tension; and a cable extending therebetween portions of the top bracket assembly and the bottom bracket assembly.

15. The fall protection system of claim 14, wherein the cable is operably coupled to the respective top and bottom bracket assemblies under a desired tension load sufficient to space the cable from a plane of the ladder.

16. The fall protection system of claim 14, wherein fall protection system further comprises a cable guide that is configured to be mountable to a rung of the ladder between the respective top and bottom bracket assembly.

17. The fall protection system of claim 14, wherein the bottom surface of the horizontal member of the top bracket assembly further defines a port that communicates with the interior cavity of the horizontal member, and wherein the port of the horizontal member of the top bracket assembly is configured to accept a first cable connector, wherein the first cable connector comprises means for grasping an end portion of the cable when the cable is subjected to tension.

18. The fall protection system of claim 14, wherein the lower portion of the elongated vertical member of the top bracket assembly defines an elongated slot that extends substantially vertically and is configured to accept the ends of a U-shaped coupling device, and wherein the U-shaped coupling device is configured to be insertable into the slot to capture a rung of the ladder between the coupling device and the exterior surface of the lower portion of the elongated vertical member.

19. The fall protection system of claim 14, wherein the support member defines a plurality of spaced openings, the plurality of spaced openings defining a first pair of staggered openings and a second pair of staggered openings, the respective first and second pairs of staggered openings being spaced to overlie portions of the spaced vertical legs of the vertical ladder, wherein each of the respective first and second pairs of staggered openings is configured to accept the ends of a U-shaped coupling device, and wherein the U-shaped coupling device is configured to capture a portion of the underlying spaced vertical legs of the vertical ladder rung of the ladder between the coupling device and the exterior surface of the support member.

20. The fall protection system of claim 14, wherein the eye bolt is secured relative to the horizontal spacing member of the bottom bracket assembly by a compression assembly positioned between a least one nut operatively received onto to a threaded end of a shaft of the eye bolt and a bottom surface of the horizontal spacing member.

21. The fall protection system of claim 20, wherein the compression assembly comprises a plurality of compression washers that are operatively received onto the shaft of the eye bolt and are configured to compress under a known load.

22. The fall protection system of claim 21, wherein the plurality of compression washers comprise compression washers having at least two different load ratings.

23. The fall protection system of claim 22, wherein the plurality of compression washers comprises a first pair of opposed compression washers having a lower load rating that are positioned adjacent a second pair of opposed compression washers having a load rating that is higher than the first pair.

24. The fall protection system of claim 23, wherein a washer is positioned between the respective first and second pairs of opposed compression washers and between the uppermost pair of opposed compression washers and the bottom surface of the horizontal spacing member of the bottom bracket assembly.

25. The fall protection system of claim 14, wherein the spacing member is positioned is a plane that is substantially parallel to a plane of a rung of the ladder.

26. The fall protection system of claim 14, wherein the trough member further comprises:

a first planer member, wherein the first planer member is coupled to a distal edge of the spacing member and extends downwardly away from a juncture of the first planer member and the spacing member at an acute angle β relative to the support member;

a second planer member, wherein the second planer member is coupled to a portion of a distal edge of the first planer member and extends outwardly transverse to the first planer member; and a third planer member, wherein the third planer member is coupled to a distal edge of the second planer member and extends transverse to the second planer member.

27. The fall protection system of claim 26, wherein the first planer member and the third planer member are positioned in planes that are substantially parallel to each other, and wherein the trough member has a U-shape in cross-section.

* * * * *